United States Patent
Dormody et al.

(10) Patent No.: US 10,704,905 B2
(45) Date of Patent: Jul. 7, 2020

(54) SYSTEMS AND METHODS FOR DETERMINING A REFERENCE PRESSURE FOR USE IN ESTIMATING AN ALTITUDE OF A MOBILE DEVICE

(71) Applicant: NextNav, LLC, Sunnyvale, CA (US)

(72) Inventors: Michael Dormody, San Jose, CA (US); Badrinath Nagarajan, San Jose, CA (US); Guiyuan Han, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 298 days.

(21) Appl. No.: 15/676,454

(22) Filed: Aug. 14, 2017

(65) Prior Publication Data

US 2018/0252521 A1    Sep. 6, 2018

Related U.S. Application Data

(60) Provisional application No. 62/467,716, filed on Mar. 6, 2017.

(51) Int. Cl.
| | |
|---|---|
| *G01C 5/06* | (2006.01) |
| *G01C 25/00* | (2006.01) |
| *G01K 7/00* | (2006.01) |
| *G01L 7/00* | (2006.01) |

(52) U.S. Cl.
CPC ............. *G01C 5/06* (2013.01); *G01C 25/00* (2013.01); *G01K 7/00* (2013.01); *G01L 7/00* (2013.01)

(58) Field of Classification Search
CPC ....................................................... G01C 5/06
See application file for complete search history.

(56) References Cited

U.S. PATENT DOCUMENTS

| | | | | |
|---|---|---|---|---|
| 2014/0114624 | A1* | 4/2014 | Buchanan | G01W 1/02 703/2 |
| 2015/0025817 | A1* | 1/2015 | Ten Kate | A61B 5/1117 702/50 |
| 2015/0127287 | A1* | 5/2015 | Wolf | G01K 19/00 702/98 |

(Continued)

*Primary Examiner* — Raymond L Nimox
(74) *Attorney, Agent, or Firm* — Kyle Pendergrass

(57) ABSTRACT

Identifying and estimating values of atmospheric conditions for use in estimating an altitude of a mobile device. Systems and methods for monitoring one or more conditions before estimating an altitude of a mobile device may receive a reference pressure that was computed using a measurement of pressure from a first reference pressure sensor at a first location, wherein the received reference pressure specifies an estimated pressure for a reference altitude, and determine if a threshold change in measured pressure by the first reference pressure sensor is detected. If the threshold change in measured pressure is detected, the systems and methods may compute a calibration value for the first reference pressure sensor, or if the threshold change in measured pressure is not detected, the systems and methods may identify a previously-determined calibration value. The systems and methods may then compute an adjusted reference pressure using the received reference pressure and either the computed calibration value or the previously-determined calibration value, and compute an estimate of the altitude of the mobile device using the adjusted reference pressure and a measurement of pressure from the mobile device.

20 Claims, 13 Drawing Sheets

(56) References Cited

U.S. PATENT DOCUMENTS

| | | | |
|---|---|---|---|
| 2015/0233713 A1* | 8/2015 | Wolf | G01C 5/06 702/166 |
| 2015/0247917 A1* | 9/2015 | Gum | H04W 4/029 342/452 |
| 2016/0047649 A1* | 2/2016 | Edge | H04W 4/025 455/73 |

* cited by examiner

SYSTEMS AND METHODS FOR DETERMINING A REFERENCE PRESSURE FOR USE IN ESTIMATING AN ALTITUDE OF A MOBILE DEVICE

BACKGROUND

A barometric-based approach for estimating an altitude of a mobile device requires (i) an accurate estimate of pressure at a location of the mobile device, (ii) an accurate estimate of pressure at a location of a remote pressure sensor, (iii) an accurate estimate of temperature at a location of a remote temperature sensor, and (iv) a known altitude of the remote pressure sensor, where the location of the remote pressure sensor and the location of the remote temperature sensor may be the same location or different locations. An estimate of an altitude of the mobile device ($h_{moblie}$) can be computed as follows:

$$h_{mobile} = h_{sensor} \mp \frac{RT_{remote}}{gM} \ln\left(\frac{P_{sensor}}{P_{mobile}}\right), \quad \text{(Equation 1)}$$

where $P_{mobile}$ is the estimate of pressure at the location of the mobile device, $P_{sensor}$ is the accurate estimate of pressure at the location of the remote pressure sensor, $T_{remote}$ is the accurate estimate of temperature at the location of the remote temperature sensor, $h_{sensor}$ is the known altitude of the remote pressure sensor, g corresponds to the acceleration due to gravity, R is the universal gas constant, and M is the molar mass of air (e.g., dry air or other).

In some cases, the estimate of pressure at the location of the remote pressure sensor is converted to a reference pressure that specifies an estimate of pressure at a reference altitude as follows:

$$P_{ref} = P_{sensor} \exp\left(-\frac{gM(h_{ref} - h_{sensor})}{RT_{remote}}\right), \quad \text{(Equation 2)}$$

where $P_{sensor}$ is the accurate estimate of pressure at the location of the remote pressure sensor, $P_{ref}$ is the reference pressure and $h_{ref}$ is the reference altitude. The altitude of the mobile device, $h_{mobile}$ is computed using Equation 1, where $h_{ref}$ is substituted for $h_{sensor}$ and $P_{ref}$ is substituted for $P_{sensor}$. The reference altitude, $h_{ref}$ may be any altitude, and is often set at sea-level.

When two or more reference pressures are available, the reference pressures are combined into a single reference pressure value (e.g., using an average, weighted average, or other suitable combination of the reference pressures), and the single reference pressure value is used for the reference pressure, $P_{ref}$.

As one of ordinary skill in the art will appreciate from Equation 1 and Equation 2, the estimate of the mobile device's altitude, $h_{mobile}$, will be accurate so long as the following information is available and accurate: (i) the estimate of the local pressure, $P_{mobile}$, (ii) the reference pressure, $P_{ref}$, and (iii) the estimate of the remote temperature, $T_{remote}$. The estimate of local pressure, $P_{mobile}$, can be computed by calibrating measurements of pressure by a local pressure sensor of the mobile device as is known in the art. Unfortunately, accuracy of the reference pressure, $P_{ref}$, and the estimated remote temperature, $T_{remote}$, depends on the accuracy of remote sensors that are available.

In some situations, a network of calibrated reference sensors is used, which produces reliable reference pressures and estimates of remote temperature that require no further adjustments. In other situations, less reliable reference sensors are used, which requires determining if the reference pressures and/or estimated remote temperatures are accurate before they are used to compute an estimate of an altitude of a mobile device. Described below are systems and methods for determining if a reference pressure is accurate, and for determining new reference pressures for use in computing an estimate of a mobile device's altitude.

DETAILED DESCRIPTION

As mentioned in the Background section, an estimate of a mobile device's altitude, $h_{mobile}$, can be accurately computed so long as the following information is available and accurate: (i) an estimate of a local pressure at a location of a mobile device, $P_{mobile}$, (ii) a reference pressure, $P_{ref}$, that specifies an estimate of pressure at a reference altitude, $h_{ref}$, and (iii) an estimate of a remote temperature, $T_{remote}$. The estimate of the mobile device's altitude, $h_{mobile}$, can be computed as follows:

$$h_{mobile} = h_{ref} \mp \frac{RT_{remote}}{gM} \ln\left(\frac{P_{ref}}{P_{mobile}}\right), \quad \text{(Equation 3)}$$

where g corresponds to the acceleration due to gravity, R is the universal gas constant, and M is the molar mass of air (e.g., dry air or other).

Unfortunately, the reference pressure, $P_{ref}$, may be unreliable and inaccurate when based on measurements from certain sources, including crowdsourced weather stations, which produce weather data, including reference pressure data) that can be useful in weather prediction owing to a spatially dense network, but that may not be accurate enough for use in navigation or location services (e.g., e911 and others). Solutions to this problem are described below, including systems and methods for determining if a reference pressure is accurate, and for determining a more-accurate reference pressure for use in computing an estimate of a mobile device's altitude.

Benefits of the systems and methods described below include quality control improvements of existing weather data so it can be used for barometric-based altitude determination in connection with navigation, emergency services, and other uses of estimated altitudes with an accuracy of one to two meters. Such weather data is widely available and meant to be used for weather forecasts, but the weather data is typically not accurate enough for the accuracy requirements of barometric-based altitude determinations. These accuracy requirements can be achieved using different systems and methods described below in connection with the figures. In some circumstances, such as when more-accurate weather data is used for navigation or emergency services, the weather data used should have high pressure resolution (e.g., pressure data from a weather station is precise to within a few Pa) and should have high temporal resolution (e.g., pressure data from a weather station is recent to within several minutes).

Figure 1:
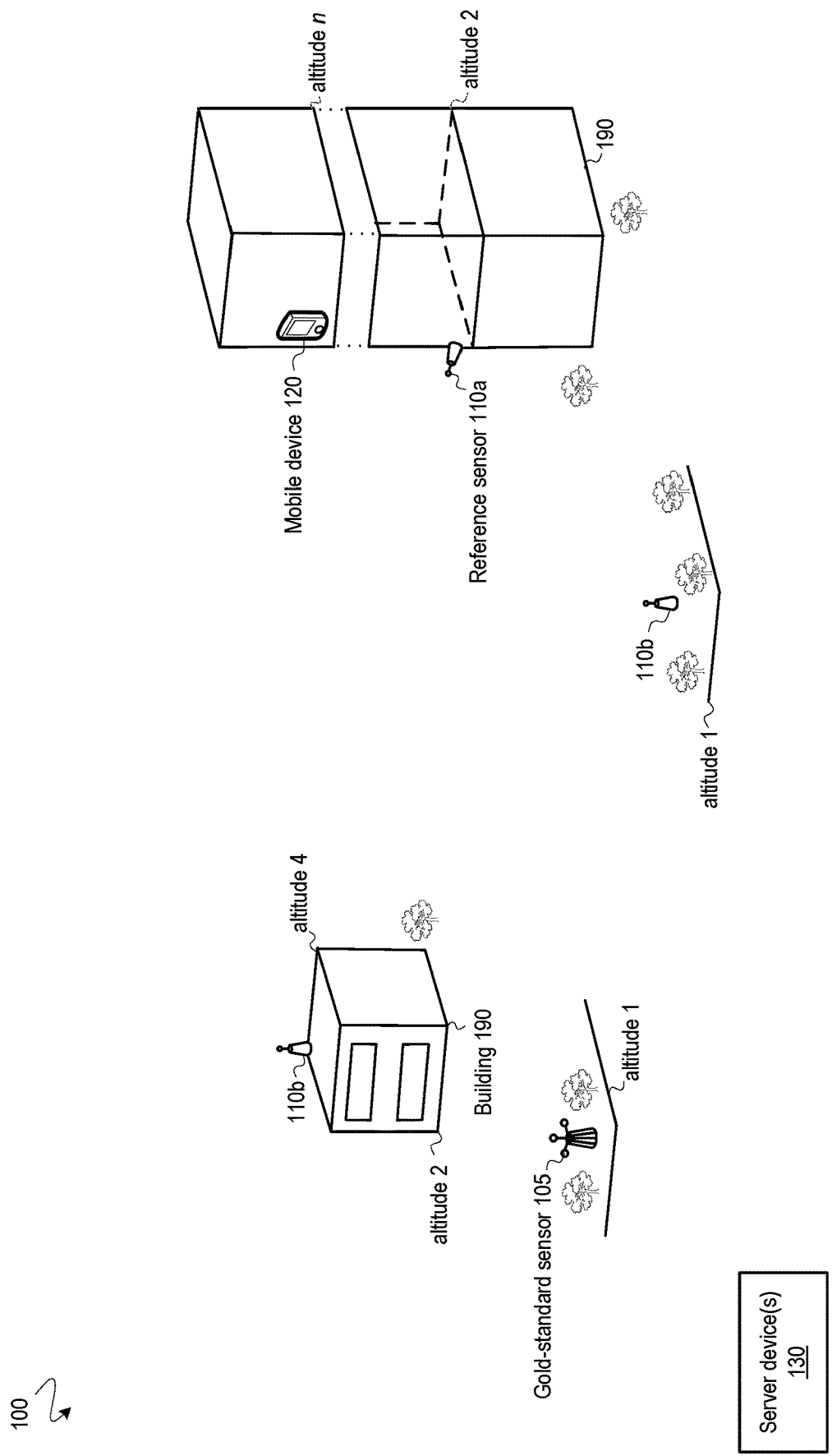
FIG. 1 depicts an operational environment for determining values of atmospheric conditions for use in estimating an altitude of a mobile device.

Attention is initially drawn to FIG. 1, which illustrates an operational environment 100 for determining values of atmospheric conditions for use in estimating an altitude of a mobile device. As shown, the operational environment 100 includes one or more gold-standard sensors 105, one or more reference sensors 110 (e.g., sensors 110a, 110b and/or 110c), one or more mobile devices 120, and one or more server devices 130. Each of the gold-standard sensors 105, the reference sensors 110, and the mobile device 120 may be located at different altitudes or depths that are inside or outside buildings 190. If these sensors are located inside buildings, compensation for any present HVAC/Stack Effect that impacts accuracy of pressure measurements relative to true pressure should be made—e.g., for examples of how such compensation can be accomplished, see U.S. application Ser. No. 15/487,215, filed Apr. 13, 2017 (CHARACTERIZING AND USING BUILDING WEATHER PROFILE PARAMETERS), which is incorporated herein by reference. If these sensors are located inside buildings, then temperature values used in equations should be sourced from an externally placed source that is not internal to any building.

The mobile device 120 is located at an unknown altitude and may take different forms, including a mobile phone, tablet, laptop, tracking tag, receiver, or another suitable device. Each of the gold-standard sensors 105 is located at a known location. Each of the reference sensors 110 is also located at a known location. Known locations may comprise an altitude, an address, a building, a building floor, a place, or other location information.

Each gold-standard sensor 105 comprises one or more different sensors, including a pressure sensor and optionally a temperature sensor. A gold-standard sensor 105 provides measurements that are within a tolerated amount of error from truth as would be understood by one of ordinary skill in the art (e.g., a gold-standard pressure sensor can be NIST traceable and may provide less than 10 Pa of error). Although such sensors may drift, their drift is less than the reference sensors 110, is negligible, or can be frequently calibrated over some definable time period so the gold-standard sensor 105 provides measurements that are within the tolerated amount of error from truth. When used in connection with different embodiments of different processes disclosed herein, the gold-standard sensor 105 measures atmospheric conditions (e.g., pressure and/or temperature).

Each reference sensor 110 comprises one or more different sensors, including a pressure sensor and optionally a temperature sensor. Pressure sensors of reference sensors 110 are assumed to drift over time, which requires calibration (e.g., numerical adjustments to reference pressures that were determined using measurements of pressure measured by the pressure sensors. Detection of drift and computation of an appropriate calibration value for a reference pressure are features that relate to certain operations disclosed herein (e.g., FIG. 4A through FIG. 4H). Temperature sensors of reference sensors 110 can also drift over time, or can overheat, which does not necessarily require calibration, but may require use of another temperature value from another source. When used in connection with different embodiments of different processes disclosed herein, a reference sensor 110 measures atmospheric conditions (e.g., pressure and/or temperature).

When the gold-standard sensor 105 or the reference sensor 110 measures a pressure at a sensor altitude, $h_{sensor}$, the measured pressure, $P_{sensor}$, may be converted to a reference pressure, $P_{ref}$, that specifies an estimated pressure at a reference altitude, $h_{ref}$, where the conversion may be provided by the following equation, or another suitable equation:

$$P_{ref} = P_{sensor} \exp\left(\frac{gM(h_{sensor} - h_{ref})}{RT_{remote}}\right). \quad \text{(Equation 4)}$$

Conversion of a measured pressure to a reference pressure may occur at the gold-standard sensor 105 or the reference sensor 110, or at another device like the server device 130, the mobile device 120, or another device. The reference pressure(s) may be used as described later with reference to different embodiments FIG. 3, FIG. 4A through FIG. 4H.

Figure 2:
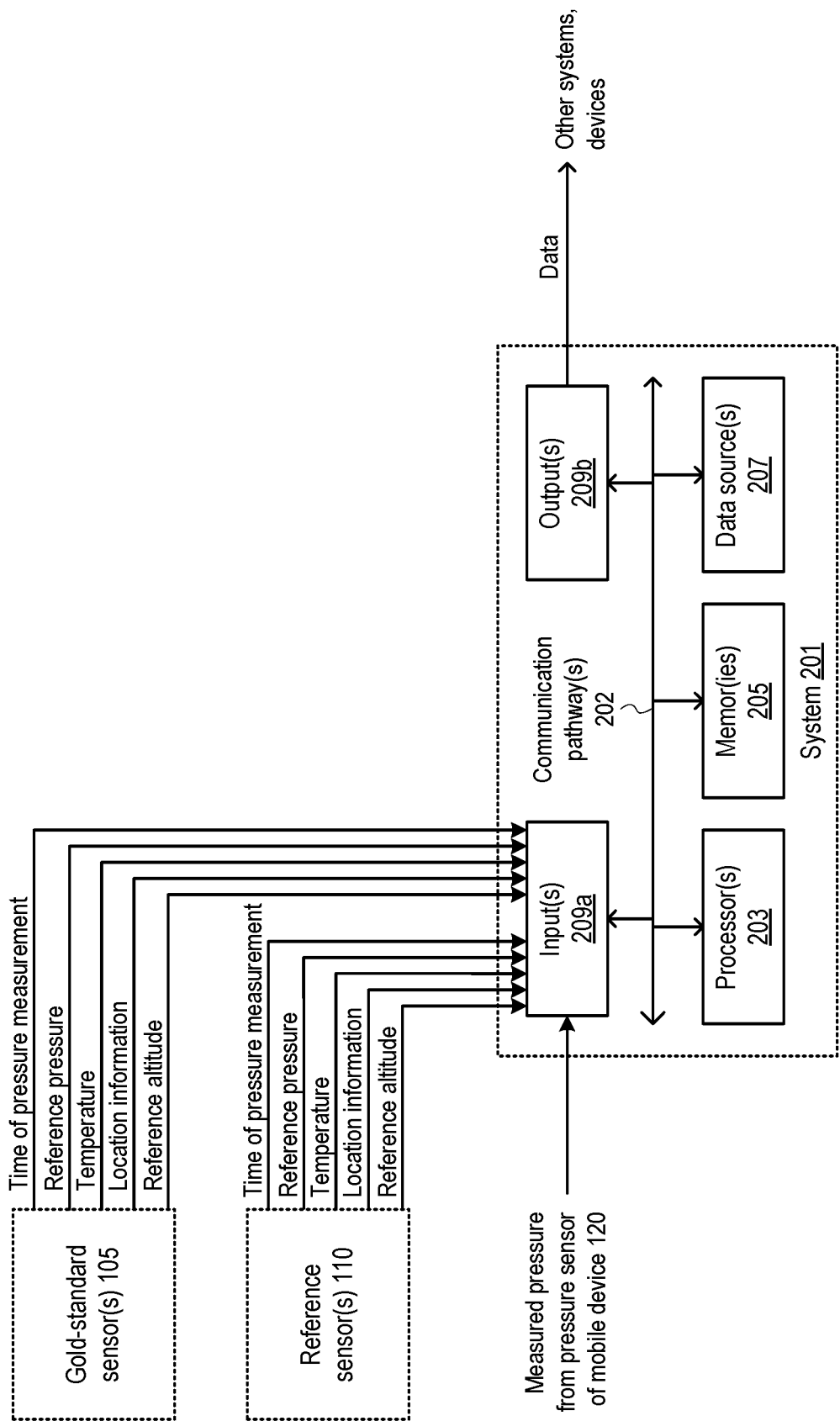
FIG. 2 depicts a system for use in performing operations described herein, including operations that determine values of atmospheric conditions for use in estimating an altitude of a mobile device.

By way of example, FIG. 2 depicts components of a system 201 for use in performing operations described herein, including operations that determine values of atmospheric conditions for use in estimating an altitude of a mobile device 120. In different embodiments, the components of the system 201 may reside in the mobile device 120, the server device 130, and/or other devices. The components of the system 201 may be co-located in one device, or may be distributed throughout a network across different devices.

As shown in FIG. 2, the system 201 includes one or more communication pathways 202 that interconnect various components together as would be known in the art. In one embodiment, the pathways 202 include one or more buses connected to each other through various bridges, controllers and/or adapters as is well known in the art. Other pathways are contemplated, including both wireless and wired pathways.

One or more processors 203 are coupled to one or more memories 205 using the pathway(s) 202. The one or more memories 205 may include one or more non-transitory processor-readable media embodying program instructions that, when executed by the one or more processors 203, cause the one or more processors 203 to perform or implement operations disclosed herein, including any or all steps related to figures depicting processes. Steps of computing, determining, using, setting and identifying may be performed by the processor(s) 203 or another suitable machine.

One or more data sources 207 that store data are also included in the system 201. The data sources 207 store received, determined, computed or other data during operations disclosed herein. One example of data stored in the data source 207 is a calibration value that may be computed by the system 201 in accordance with operations of FIG. 4A. Well-known approaches for exchanging data between the data sources 207 and other components (e.g., a processor) may be used during different operations, including such operations of receiving, identifying, setting, and others disclosed herein.

One or more inputs 209a are shown to receive different data from gold-standard sensors 105 and reference sensors 110. Examples of data include reference pressures, measured temperatures, location information, a reference altitude, and a time when a pressure was measured for use in computing the reference pressure. The inputs 209a may also receive data from a pressure sensor of the mobile device 120, which is a component of the system 201 when the system 201 is the mobile device 120. The data may alternatively come from other intermediary device(s) that store or retrieve the data. One or more outputs 209b are shown to send output data to other systems or devices as desired. The inputs 209a and outputs 209b may be any suitable component known in the art.

Examples of reference sensors 110 include, but are not limited to, crowdsourced weather stations like NOAA, Weather Underground, Earth Networks, hobby grade weather stations installed by private individuals at their homes or businesses, or others. A reference sensor 110 could also be another mobile device with a pressure sensor. When the reference sensor 110 is another mobile device, the remote temperature may be sourced from a temperature sensor of that mobile device (e.g., if the temperature reflects outside ambient temperature within a tolerated amount of error) or another source like a weather station.

Data such as a reference pressure, reference altitude, measurement of temperature, and location information of a gold-standard sensor 105 or a reference sensor 110 may be received by different devices (e.g., the mobile device 120 or the server 130) from wherever that data is stored. For example, data from weather stations may be provided to a common server (e.g., of the server devices 130), and that data may then be accessed from that common server. Transfer of the data may occur using known wireless or wired transmission technologies. Such data may be used to perform different operations described later with reference to figures depicting processes. In practice, the common server typically cleans and reduces the data using some quality checks. After receiving data from one or more reference sensors 110, the common server may convert measurements of pressure to a reference pressure at a reference altitude (e.g., sea-level) using a measurement of temperature before storing that reference pressure at weather data. In practice, common servers often provide an application program interface (API) or software function call that a mobile device or another server can query to access real-time or historical weather station data that is available. A typical query to the common server will return the weather data for one or more queried weather stations, or for one or more queried regions or locations in a network. Quality control procedures used by publicly-available NOAA weather stations are published in scientific literature. Other quality control procedures used by private entities are often proprietary, but they typically include outlier checks and some model versus measurement checks. However, accuracy of public and private weather stations may be less useful for altitude determination because the data quality is impacted by a non-uniform distribution of weather station sensor types, the absence of routine calibration and stability issues. Hence, different approaches for evaluating and using data from different weather stations for altitude determination are discussed below. As understood by one of ordinary skill in the art, the operational environment 100 of FIG. 1 and/or the system 201 of FIG. 2 may carry out different operations of these different approaches.

Figure 3:
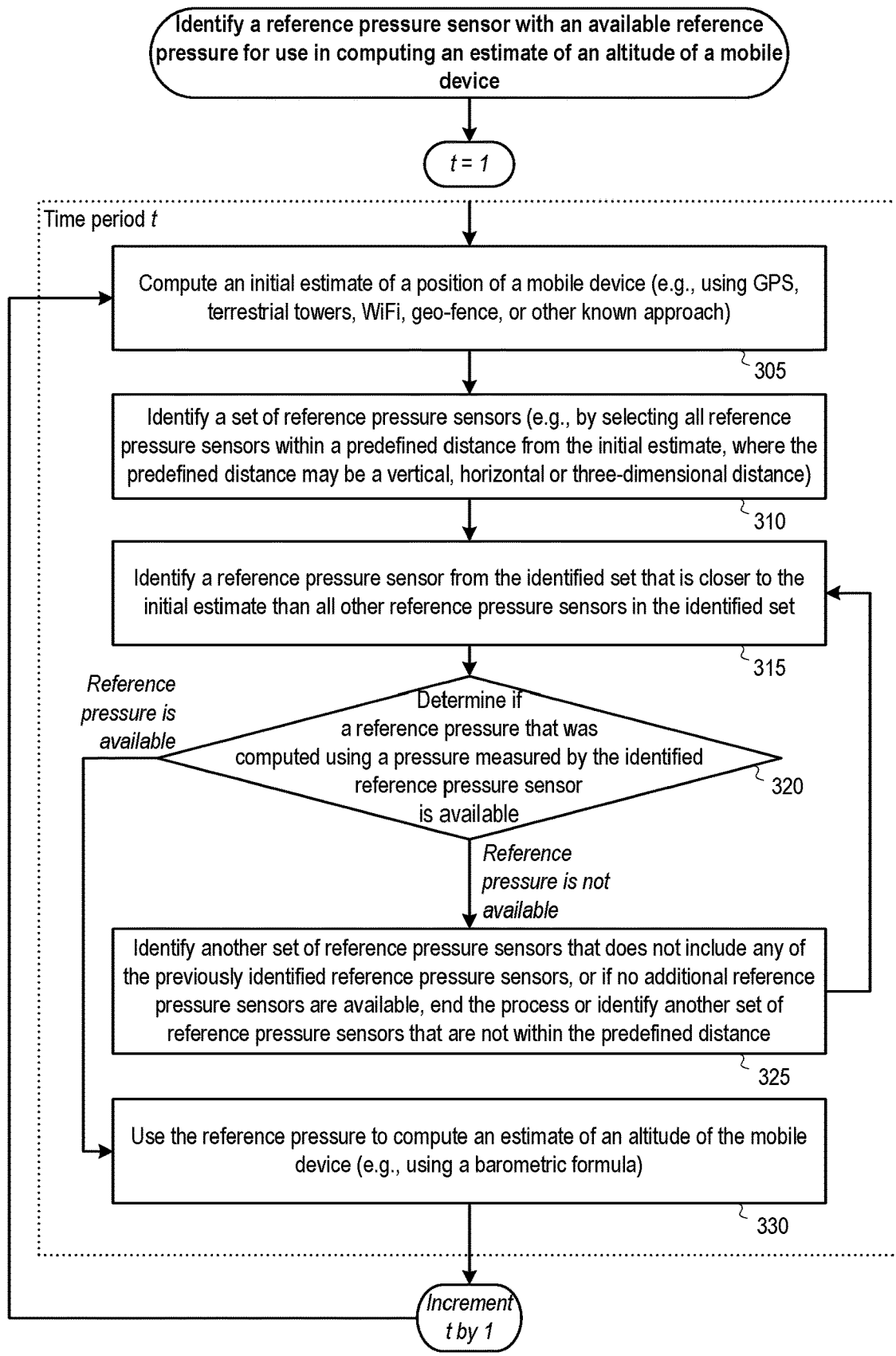
FIG. 3 provides a process for identifying an available reference pressure corresponding to the closest reference pressure sensor that can be used in computing an estimate of an altitude of a mobile device.

Identifying an Available Reference Pressure Corresponding to the Closest Reference Pressure Sensor (FIG. 3)

Since pressure can vary across a region due to weather anomalies and other reasons, it is often desirable to use a reference pressure that was determined using a measurement of pressure from a nearby reference sensor with respect to the perceived location of the mobile device. However, the closest reference sensor can go offline or be otherwise unavailable at different times, so a method for identifying the closest reference sensor at any given time is needed. A process for identifying an available reference pressure corresponding to the closest reference pressure sensor that can be used in computing an estimate of an altitude of a mobile device is shown in FIG. 3.

As shown in FIG. 3, an initial estimate of a position of a mobile device is computed (step 305). In different embodiments, the initial estimate is computed using GPS, terrestrial towers, WiFi beacons, a geo-fence, or another known approach. A set of reference pressure sensors is identified (step 310). In one embodiment, all reference pressure sensors within a predefined distance from the initial estimate are selected, where the predefined distance may be a vertical, horizontal or three-dimensional value of distance. A first reference pressure sensor in the identified set of reference pressure sensors that is closer to the initial estimate than all other reference pressure sensors in the identified set of reference pressure sensors is identified (step 315). A determination is made as to whether a reference pressure corresponding to the identified reference pressure sensor is available (step 320).

When the result of step 320 is a determination that the reference pressure is not available from the identified reference pressure sensor, a determination is made as to whether the currently identified set of reference pressure sensors includes at least one reference pressure sensor other than the identified reference pressure sensor. If the currently identified set of reference pressure sensors includes at least one reference pressure sensor other than the identified reference pressure sensor, all reference pressure sensors in the currently identified set of reference pressure sensors except the identified reference pressure sensor are identified as another set of reference pressure sensors (step 325), and the process returns to step 315 for this other set of reference pressure sensors. If the currently identified set of reference pressure sensors does not include at least one reference pressure sensor other than the identified reference pressure sensor, then the process ends (step 325).

When the result of step 320 is a determination that the reference pressure is available from the identified reference pressure sensor(s), the reference pressure is used to compute an estimate of an altitude of a mobile device (step 330).

Steps 305-330 are performed during a time period t, where t equals 1 before being incremented, after which steps 305-330 may be repeated for a new time period t.

The operation of FIG. 3 is useful when pressure data, such as measured pressures or reference pressures of a closer reference sensor (e.g., the reference sensor 110*a*), are discontinuous, and when pressure data of a reference sensor that is further away (e.g., the reference sensor 110*b*) is available during time periods when pressure data of the closer reference sensor is not available. The operation of FIG. 3 permits continuous use of pressure data of the closest available reference sensor. The operation of FIG. 3 is illustrated by the data plots shown in FIG. 5A and FIG. 5B.

Figure 4A:
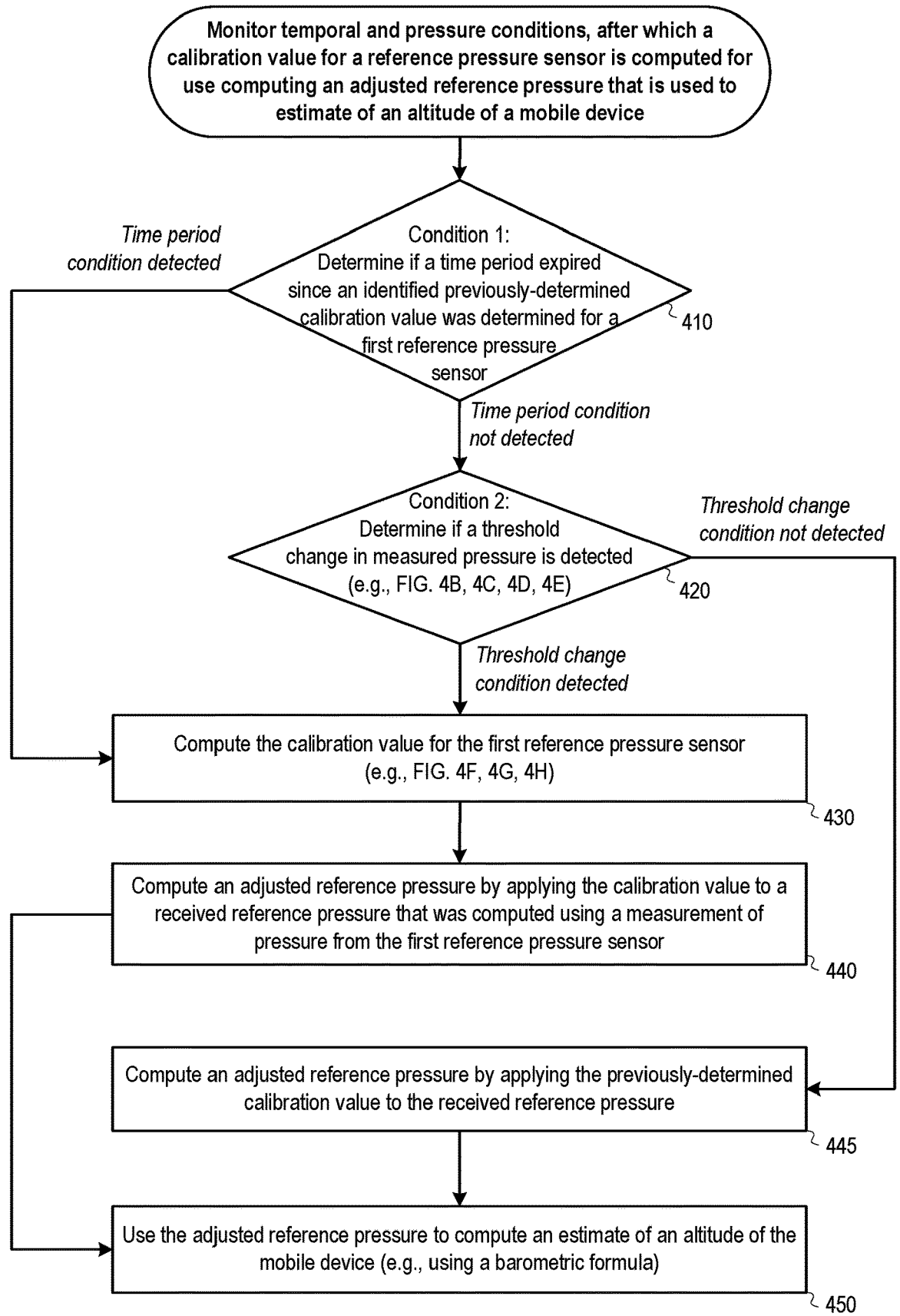
FIG. 4A provides a process for monitoring temporal and/or pressure measurement conditions, after which a calibration value for a reference pressure sensor is computed for use in computing an adjusted reference pressure that is used to estimate of an altitude of a mobile device.
Figure 5A:
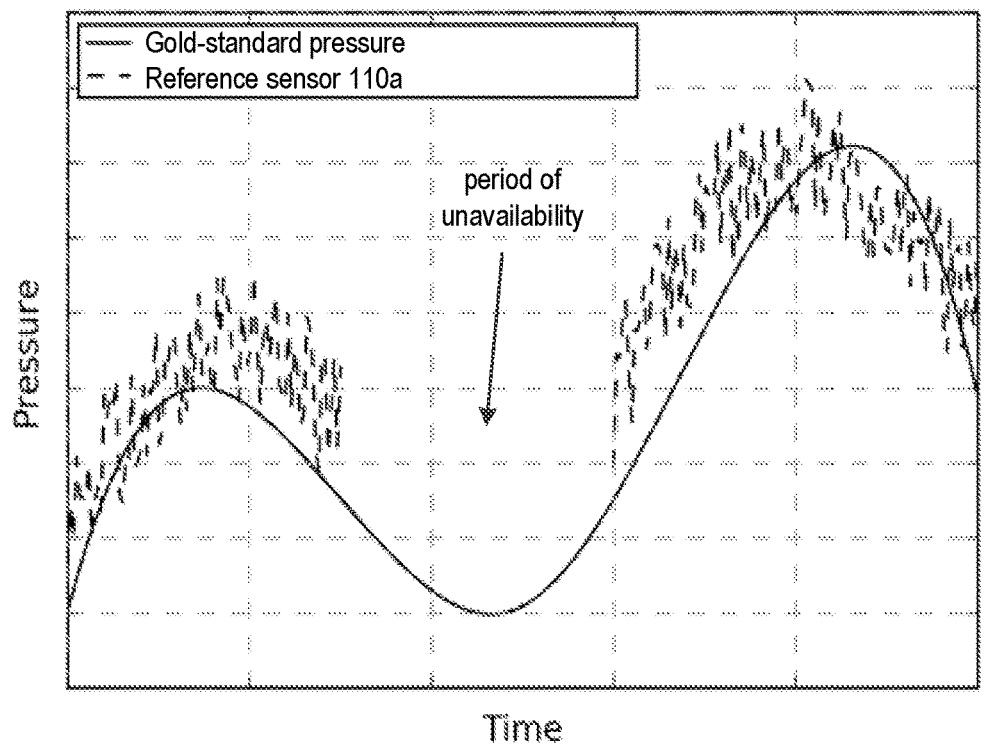
FIG. 5A illustrates a plot of discontinuous pressure data using pressure data for one reference sensor.
Figure 5B:
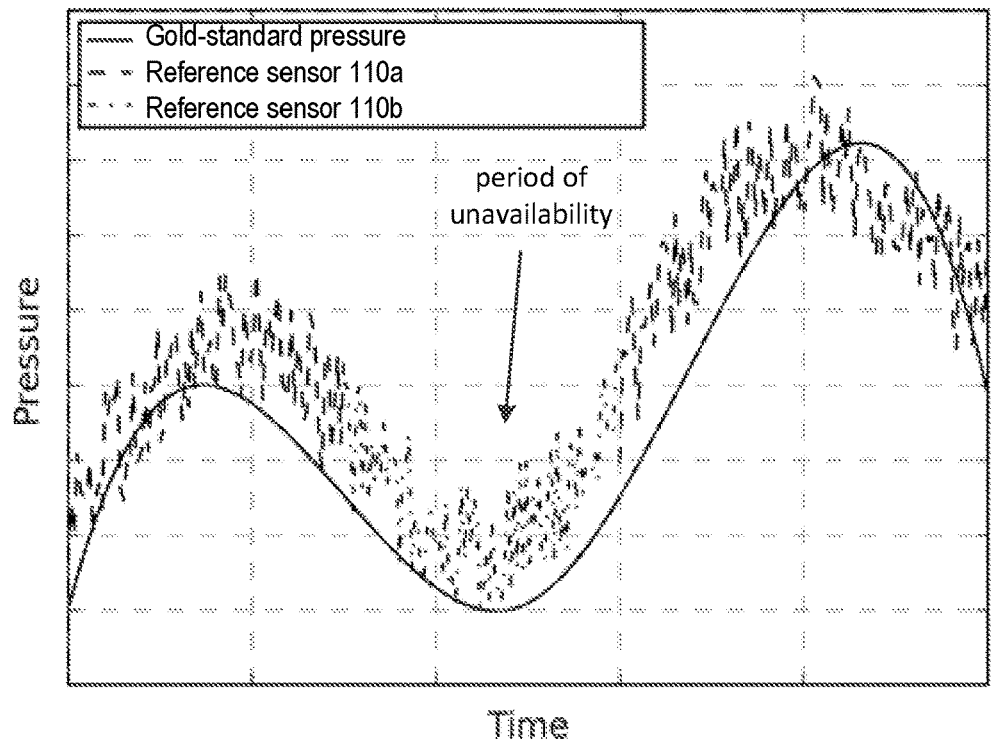
FIG. 5B illustrates a plot of continuous pressure data using pressure data for two reference sensors.

As shown in FIG. 5A, a closer reference sensor (e.g., the reference sensor 110*a*) does not provide pressure data during a period of unavailability. As shown in FIG. 5B, the next closest reference sensor (e.g., the reference sensor 110*b*) provides pressure data during the period of unavailability. Of course, the method of FIG. 3 is not limited to the second nearest reference sensor (e.g., the reference sensor 110*b*). If both the first and the second nearest reference sensors (e.g., the reference sensors 10*a* and 110*b*) are not available during a time period, the method will use pressure data from another reference sensor (e.g., the reference sensor 110*c* or another sensor) until pressure data continuity is obtained. In cases where multiple reference sensors produce pressure data in the same time period, only pressure data from one reference sensor may be used, or data from two or more reference sensors may be used (e.g., by averaging or otherwise combining the pressure data). Continuous pressure data permits on-demand or continuous determination of altitude, as well as on-demand or continuous calibration monitoring (e.g., like the monitoring discussed below with reference to FIG. 4A).

Monitoring Temporal and/or Pressure Measurement Conditions (FIG. 4A)

The reliability of a reference sensor may be evaluated by how well the reference sensor measures true ambient pressure over time given expected drift of the reference sensor. The reliability of a reference sensor may also be evaluated based on whether the reference sensor erroneously measures large jumps in pressure over a particular time period.

A process for monitoring temporal and/or pressure measurement conditions for a reference pressure sensor is shown in FIG. 4A. If a temporal and/or pressure measurement condition is identified, a calibration value for the reference pressure sensor is computed for use in computing an adjusted reference pressure that is used to estimate of an altitude of a mobile device. The process of FIG. 4A is useful when direct control over calibration of a reference sensor is not possible, and when measurements of pressure by the reference sensor are not within a tolerated amount of pressure from the actual pressure the reference sensor is measuring. By way of example, direct control over calibration of a reference sensor may not be possible when an uncalibrated reference sensor is operated by a third party, a reference sensor is moved and in need of calibration regardless of who operates that reference sensor, the quality of the sensing element of the reference sensor is unknown, or other circumstances.

As shown in FIG. 4A, a determination is made as to whether a first condition is met—e.g., whether a time period T expired since an identified, previously-determined calibration value was determined for a first reference pressure sensor (step 410). If the first condition is met (e.g., the time period T expired), then a calibration value is determined (step 430). If the first condition is not met (e.g., if the time period T has not expired), then a determination is made as to whether a second condition is met—e.g., whether a threshold change in measured pressure from first reference pressure sensor is detected (step 420).

If the second condition is met (e.g., if the threshold change in measured pressure from first reference pressure sensor is detected), a calibration value is determined (step 430), and the calibration value is used to compute an adjusted reference pressure by applying the calibration value to a received reference pressure that was computed using a measurement of pressure from the first reference pressure sensor (step 440). If the change condition is triggered, then the measurement of pressure before the change is P_before and the measurement of pressure after the change is P_after, then ΔP=P_after −P_before. Then all pressure going forward is measured as P_adjusted=P−ΔP.

If the second condition is not met (e.g., if the threshold change in measured pressure from first reference pressure sensor is not detected), the previously-determined calibration value (see step 410) is used to compute an adjusted reference pressure by applying the previously-determined calibration value to the received reference pressure (step 445). In at least one embodiment, the previously-determined calibration value is applied to the received reference pressure in the same way the computed calibration is applied to the received reference pressure.

The adjusted reference pressure is used to compute an estimate of an altitude of the mobile device (step 450). By way of example, the following equation may be used to compute the estimate of the altitude:

$$h_{mobile} = h_{ref} \mp \frac{RT_{remote}}{gM} \ln\left(\frac{P_{ref\_adj}}{P_{mobile}}\right), \quad \text{(Equation 5)}$$

where $h_{mobile}$ is the estimate of an altitude of the mobile device, $P_{ref\_adj}$ is the adjusted reference pressure, $h_{ref}$ is the reference altitude, $P_{mobile}$ is a measurement of pressure from the mobile device, $T_{remote}$ is a measurement of a remote temperature, g corresponds to the acceleration due to gravity, R is the universal gas constant, and M is the molar mass of air (e.g., dry air or other). Alternatively, the adjusted reference pressure may be combined with other reference pressures or adjusted reference pressures to compute a final reference pressure value that is used instead of the adjusted reference pressure $P_{ref\_adj}$ in Equation 5.

In different embodiments of FIG. 4A, different steps are available to be performed. For example, in a first embodiment, all steps are available to be performed. In a second embodiment, only steps 410 and 430-450 are available to be performed. In a third embodiment, only steps 420-450 are available to be performed. In a fourth embodiment, only step 420 is available to be performed.

Sometimes measurements of pressure or reference pressures based on those measurements for a reference sensor will suddenly change in an amount that is physically impossible (e.g., increase or decrease by a predefined amount of hPa/mbar over a predefined time period). Estimating a mobile device's altitude using a reference pressure resulting from a sudden change could result in an estimated altitude that is inaccurate by many meters, which is often not useful for navigation, emergency location, and other services. Different implementations of step 420 for detecting sudden changes are discussed below with reference to FIGS. 4B, 4C, 4D, and 4E. Different implementations of step 430 for determining a calibration value are discussed below with reference to FIGS. 4F, 4G, and 4H. By way of example, in certain embodiments, the implementation of FIG. 4F is used only after the first condition is met during step 410, the implementation of FIG. 4G is used only after the first condition is met during step 410, and the implementation of FIG. 4H is used only after the second condition is met during step 420.

Determine if a Threshold Change in Measured Pressure is Detected (Step 420)

Figure 4B:
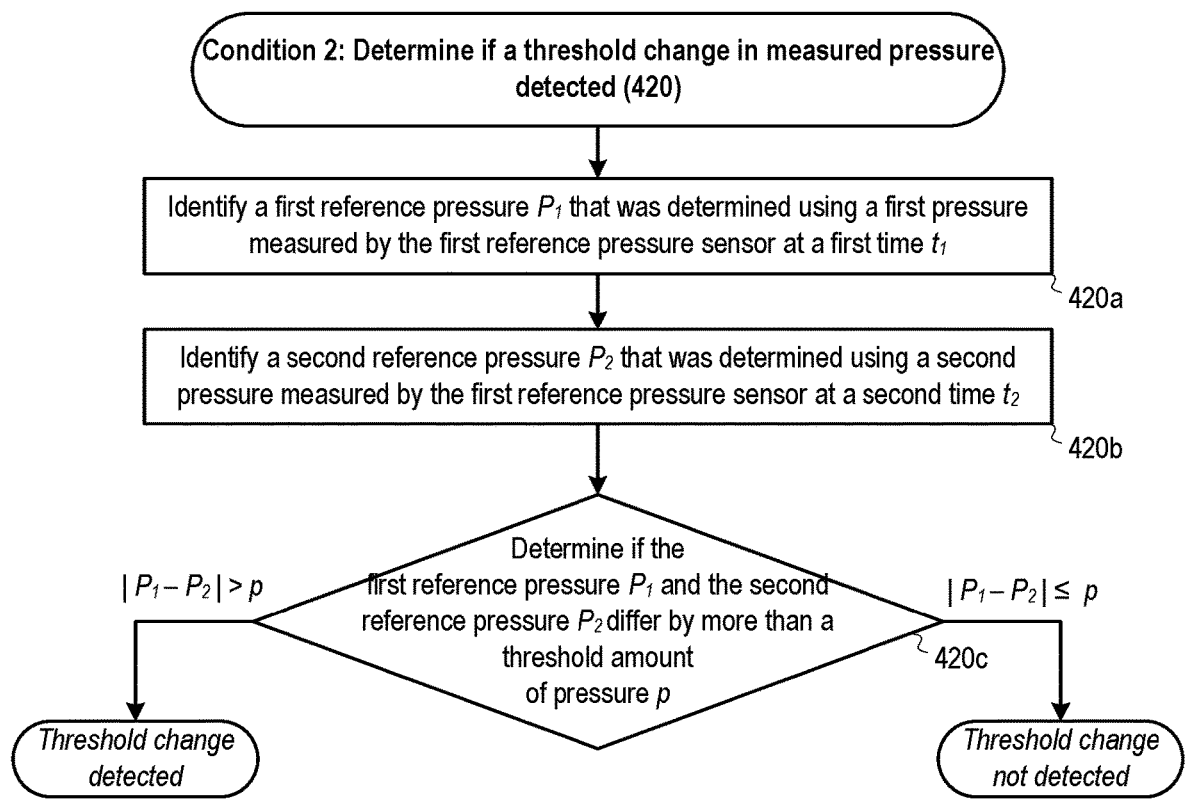
FIG. 4B provides a process for determining if a threshold change in measured pressure is detected during the process for monitoring temporal and/or pressure measurement conditions.

A first implementation for determining if a threshold change in measured pressure is detected at step 420 includes sub-steps provided in FIG. 4B. As shown, a first reference pressure $P_1$ that was determined using a first measurement of pressure measured by the first reference pressure sensor at a first time $t_1$ is identified (sub-step 420a), and a second reference pressure $P_2$ that was determined using a second measurement of pressure measured by the first reference pressure sensor at a second time $t_2$ is identified (sub-step 420b). A determination is made as to whether the first reference pressure $P_1$ and the second reference pressure $P_2$ differ by more than a threshold amount of pressure p (sub-step 420c). The value of p may vary, and the difference in time between the first time $t_1$ and the second time $t_2$ may vary. In one embodiment, p equals 2 mbar/hPa and the difference in time is less than or equal to 1 hour, since such a change would typically be unphysical and indicate an instrumental error of the first reference pressure sensor. In another embodiment, p equals 1 mbar/hPa and the difference in time is less than or equal to 10 minutes, since such a change would typically be unphysical and indicate an instrumental error of the first reference pressure sensor. The threshold change is detected when $|P_1-P_2|>p$. The threshold change is not detected when $|P_1-P_2|\leq p$.

Figure 4C:
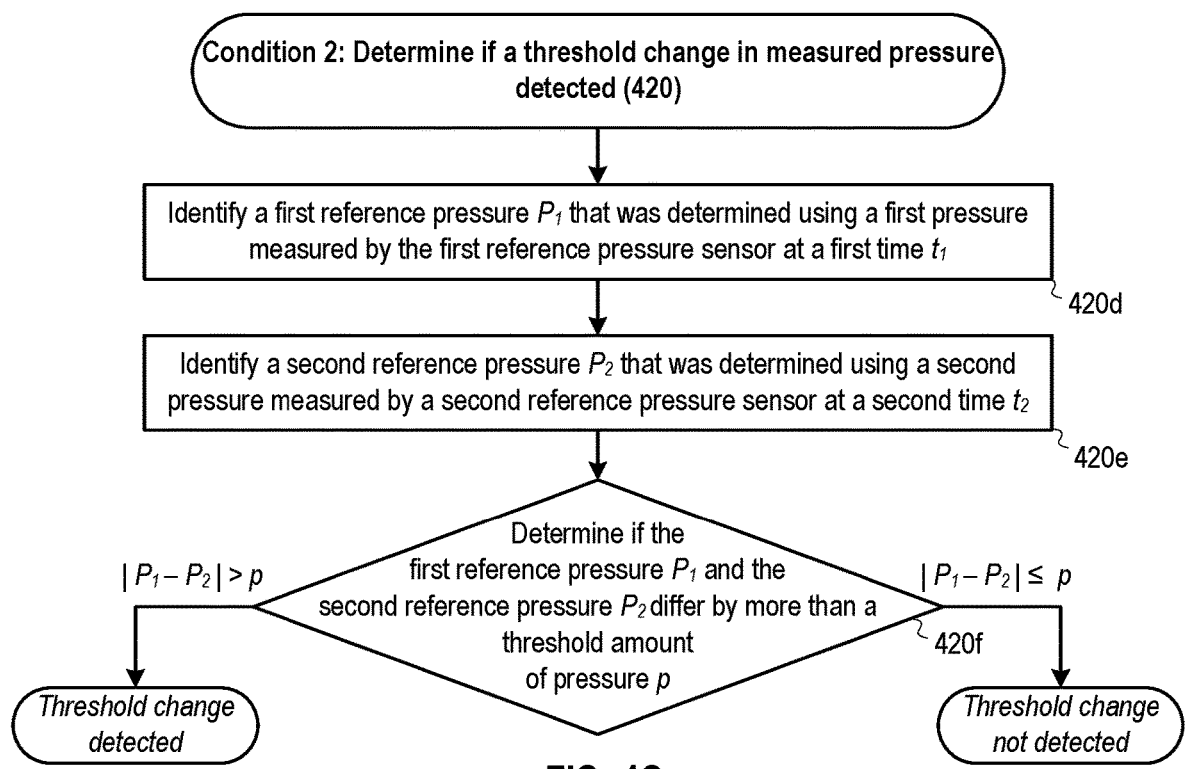
FIG. 4C provides another process for determining if a threshold change in measured pressure is detected during the process for monitoring temporal and/or pressure measurement conditions.

A second implementation for determining if a threshold change in measured pressure is detected at step 420 includes sub-steps provided in FIG. 4C. As shown, a first reference pressure $P_1$ that was determined using a first measurement of pressure measured by the first reference pressure sensor at a first time $t_1$ is identified (sub-step 420d), and a second reference pressure $P_2$ that was determined using a second measurement of pressure measured by a second reference pressure sensor at a second time $t_2$ is identified (sub-step 420e). A determination is made as to whether the first reference pressure $P_1$ and the second reference pressure $P_2$ differ by more than a threshold amount of pressure p (sub-step 420f). By way of example, p may equal 2 mbar/hPa (if a time difference between the first time and the second time is less than or equal to 1 hour), or 1 mbar/hPa if the time difference is less than or equal to 10 minutes. The values of p may vary depending on variation owing to sensor noise of the first and second reference pressure sensors, or spacing between the first and second reference pressure sensors. The threshold change is detected when $|P_1-P_2|>p$. The threshold change is not detected when $|P_1-P_2|\leq p$. In one embodiment, the first time and the second time are different times within a threshold amount of time (e.g., 10 minutes or less). In another embodiment, the first time and the second time are the same time. In different embodiments of FIG. 4C, the second reference pressure sensor is a reference sensor 110 or a gold-standard sensor 105.

Figure 4D:
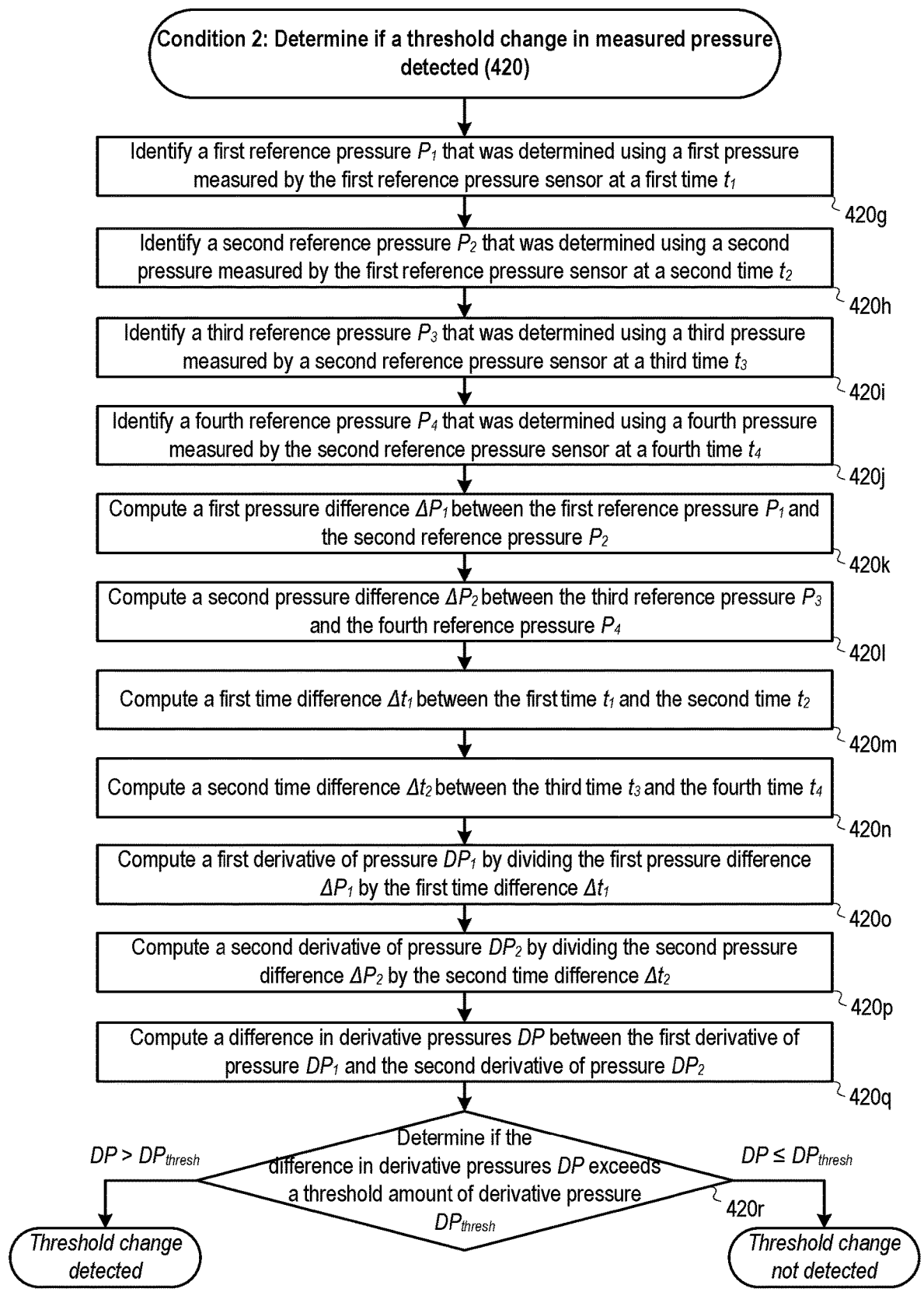
FIG. 4D provides yet another process for determining if a threshold change in measured pressure is detected during the process for monitoring temporal and/or pressure measurement conditions.

A third implementation for determining if a threshold change in measured pressure is detected at step 420 includes sub-steps provided in FIG. 4D. As shown, a first reference pressure $P_1$ that was determined using a first measurement of pressure measured by the first reference pressure sensor at a first time $t_1$ is identified (sub-step 420g), and a second reference pressure $P_2$ that was determined using a second measurement of pressure measured by the first reference pressure sensor at a second time $t_2$ is identified (sub-step 420h). A third reference pressure $P_3$ that was determined using a third measurement of pressure measured by a second reference pressure sensor at a third time $t_3$ is identified (sub-step 420i), and a fourth reference pressure $P_4$ that was determined using a fourth measurement of pressure measured by the second reference pressure sensor at a fourth time $t_4$ is identified (sub-step 420j). A first pressure difference $\Delta P_1$ between the first reference pressure $P_1$ and the second reference pressure $P_2$ is computed (sub-step 420k), and a second pressure difference $\Delta P_2$ between the third reference pressure $P_3$ and the fourth reference pressure $P_4$ is computed (sub-step 420l). A first time difference $\Delta t_1$ between the first time $t_1$ and the second time $t_2$ is computed (sub-step 420m), and a second time difference $\Delta t_2$ between the third time $t_3$ and the fourth time $t_4$ is computed (sub-step 420n). A first derivative of pressure $DP_1$ is computed by dividing the first pressure difference $\Delta P_1$ by the first time difference $\Delta t_1$ (sub-step 420o), and a second derivative of pressure $DP_2$ is computed by dividing the second pressure difference $\Delta P_2$ by the second time difference $\Delta t_2$ (sub-step 420p). A difference in derivative pressures DP between the first derivative of pressure $DP_1$ and the second derivative of pressure $DP_2$ is computed (sub-step 420q). A determination is made as to whether the difference in derivative pressures DP exceeds a threshold amount of derivative pressure $DP_{thresh}$ (sub-step 420r)—e.g., whether the absolute value of DP exceeds $DP_{thresh}$. By way of example, if $DP_{threh}$ is 10, $DP_1$ is 20, and $DP_2$ is −3, then DP is 23, which would exceed the threshold $DP_{thresh}$. The threshold change is detected when $DP>DP_{thresh}$—e.g., when $|DP|>DP_{thresh}$. The threshold change is not detected when $DP\leq DP_{thresh}$—e.g., when $|DP|\leq DP_{thresh}$. By way of example, $DP_{thresh}$ may be 1 mbar/hPa per hour. In different embodiments of FIG. 4D, the second reference pressure sensor is a reference sensor 110 or a gold-standard sensor 105.

Figure 4E:
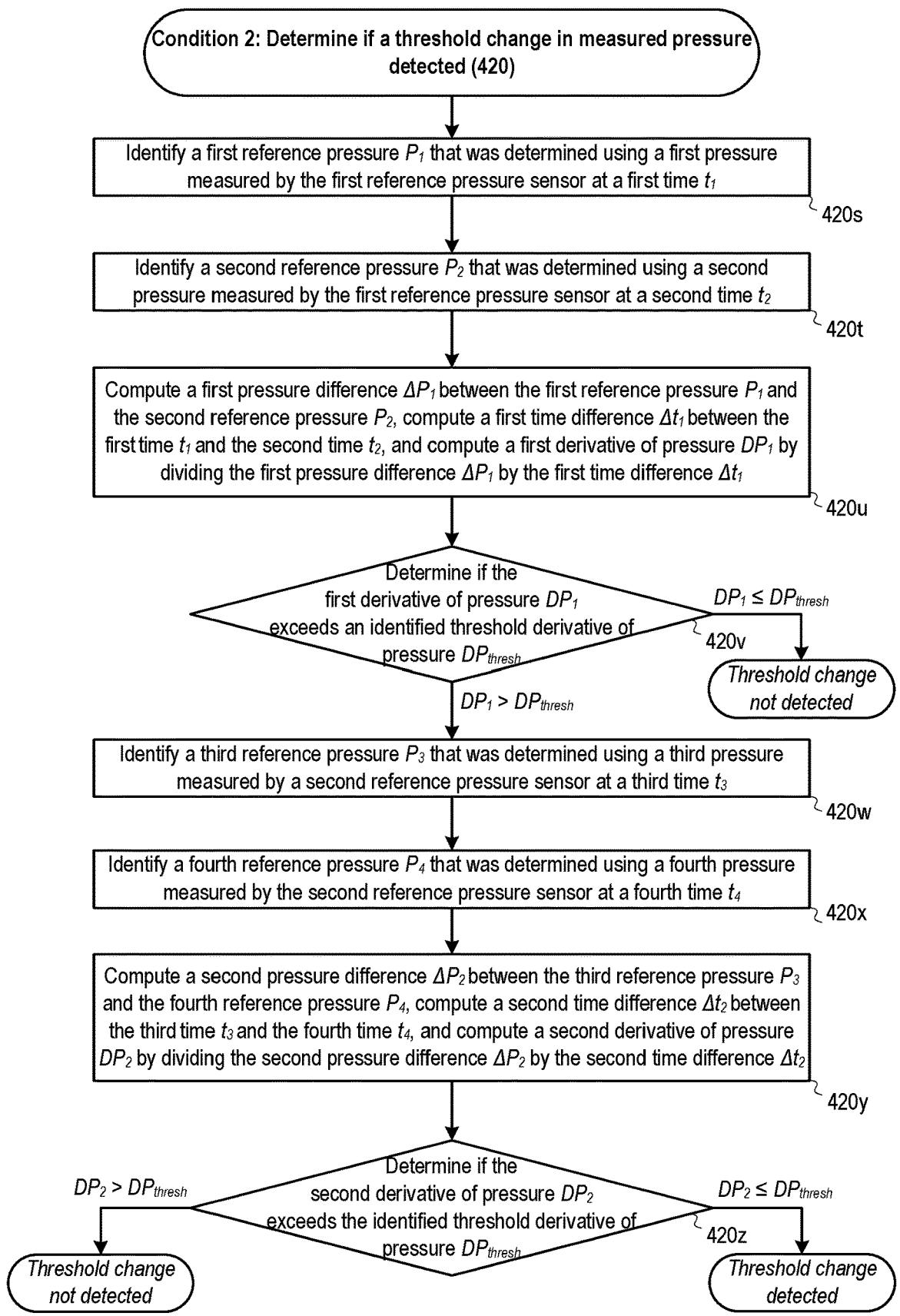
FIG. 4E provides yet another process for determining if a threshold change in measured pressure is detected during the process for monitoring temporal and/or pressure measurement conditions.
Figure 4F:
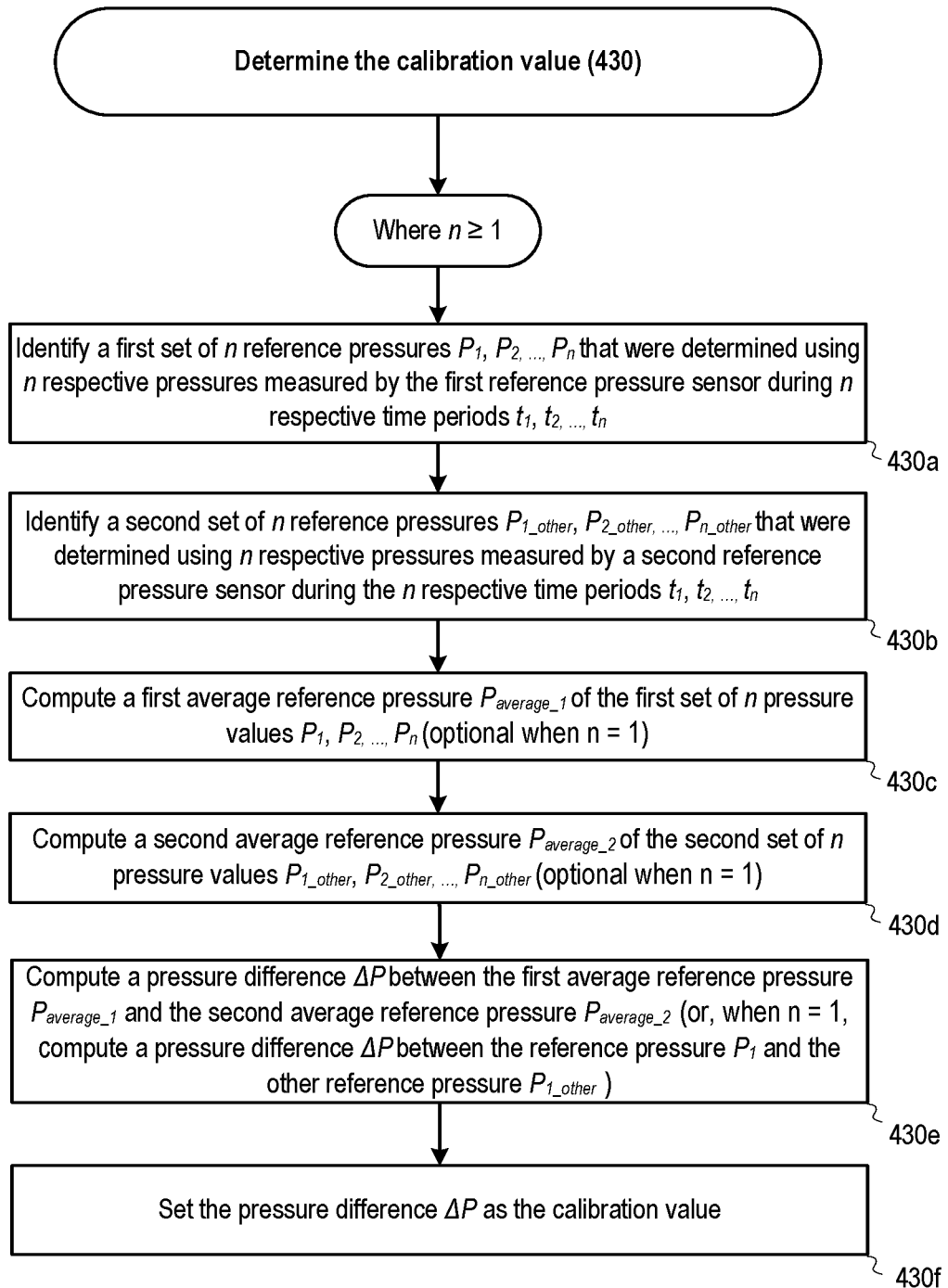
FIG. 4F provides a process for determining a calibration value during the process for monitoring temporal and/or pressure measurement conditions.
Figure 4G:
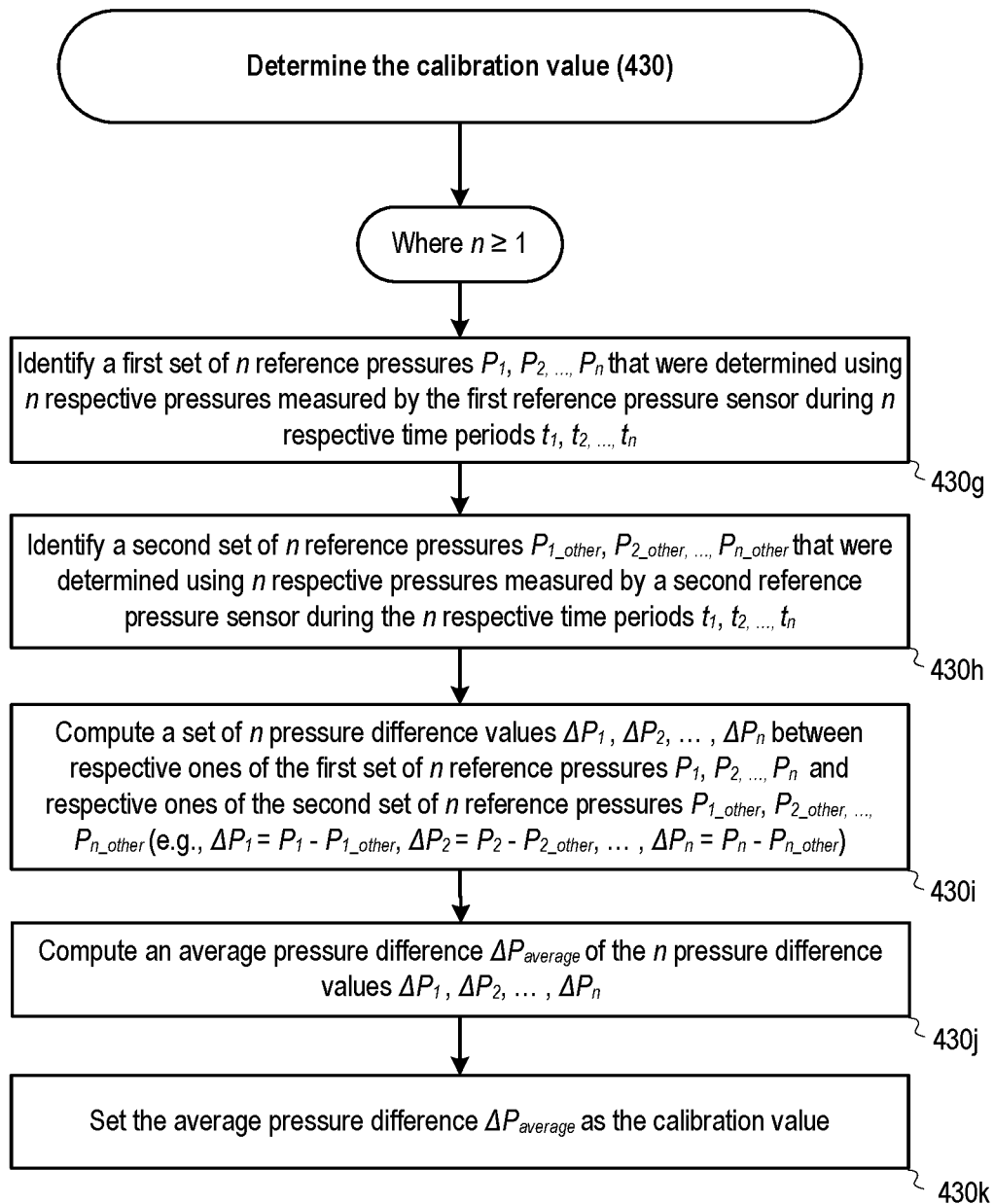
FIG. 4G provides another process for determining a calibration value during the process for monitoring temporal and/or pressure measurement conditions.
Figure 4H:
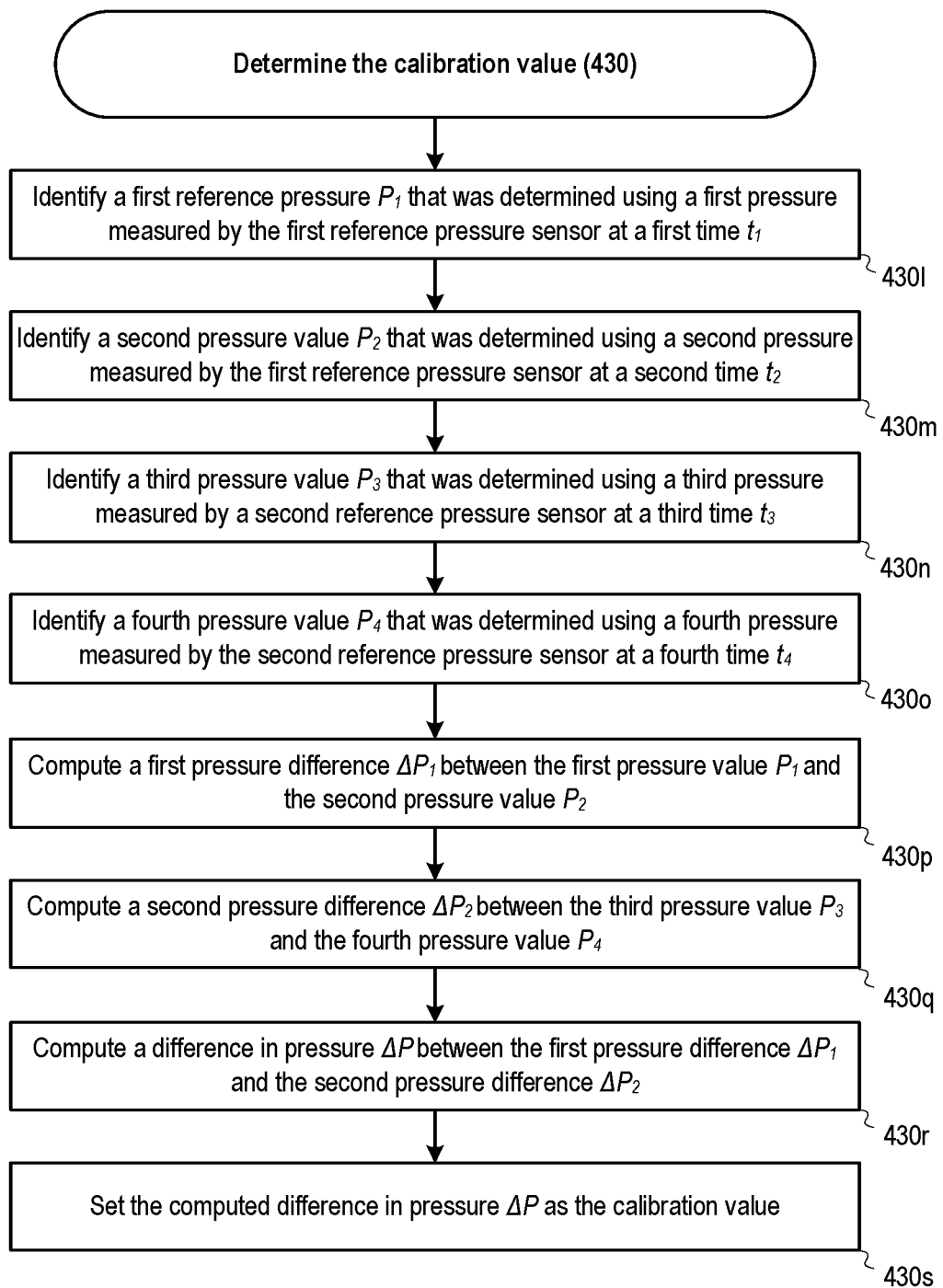
FIG. 4H provides yet another process for determining a calibration value during the process for monitoring temporal and/or pressure measurement conditions.

A fourth implementation for determining if a threshold change in measured pressure is detected at step 420 includes sub-steps provided in FIG. 4E. As shown, a first reference pressure $P_1$ that was determined using a first measurement of pressure measured by the first reference pressure sensor at a first time $t_1$ is identified (sub-step 420s), and a second reference pressure $P_2$ that was determined using a second measurement of pressure measured by the first reference pressure sensor at a second time $t_2$ is identified (sub-step 420t). A first pressure difference $\Delta P_1$ between the first reference pressure $P_1$ and the second reference pressure $P_2$ is computed, a first time difference $\Delta t_1$ between the first time $t_1$ and the second time $t_2$ is computed, and a first derivative of pressure $DP_1$ is computed by dividing the first pressure difference $\Delta P_1$ by the first time difference $\Delta t_1$ (sub-step 420u). A determination is made as to whether the first derivative of pressure $DP_1$ exceeds an identified threshold derivative of pressure $DP_{thresh}$ (sub-step 420v)—e.g., whether the absolute value of $DP_1$ exceeds $DP_{thresh}$. The threshold change is not detected when $DP_1 \leq DP_{thresh}$—e.g., when $|DP_1| \leq DP_{thresh}$. Otherwise, when $DP_1 > DP_{thresh}$ (e.g., when $|DP_1| > DP_{thresh}$), a third reference pressure $P_3$ that was determined using a third measurement of pressure measured by a second reference pressure sensor at a third time $t_3$ is identified (sub-step 420w), and a fourth reference pressure $P_4$ that was determined using a fourth measurement of pressure measured by the second reference pressure sensor at a fourth time $t_4$ is identified (sub-step 420x). A second pressure difference $\Delta P_2$ between the third reference pressure $P_3$ and the fourth reference pressure $P_4$ is computed, a second time difference $\Delta t_2$ between the third time $t_3$ and the fourth time $t_4$ is computed, and a second derivative of pressure $DP_2$ is computed by dividing the second pressure difference $\Delta P_2$ by the second time difference $\Delta t_2$ (sub-step 420y). A determination is made as to whether the second derivative of pressure $DP_2$ exceeds the identified threshold derivative of pressure $DP_{thresh}$ (sub-step 420z)—e.g., whether the absolute value of $DP_2$ exceeds $DP_{thresh}$. The threshold change is detected when $DP_2 \leq DP_{thresh}$—e.g., when $|DP_2| \leq DP_{thresh}$. The threshold change is not detected when $DP_2 > DP_{thresh}$—e.g., when $|DP_2| > DP_{thresh}$. In some embodiments, steps 420w through 420z are repeated for other available measured pressures from other reference pressure sensors before determining if the threshold change is not detected during step 420z. By way of example, $DP_{thresh}$ may be 1 mbar/hPa per hour. In different embodiments of FIG. 4E, the second reference pressure sensor is a reference sensor 110 or a gold-standard sensor 105.

Compute the Calibration Value (Step 430)

A first implementation for determining a calibration value at step 430 includes sub-steps provided in FIG. 4F. As shown, a first set of n reference pressures $P_1, P_2, \ldots, P_n$ that were determined using n respective measurements of pressures measured by the first reference pressure sensor during n respective time periods $t_1, t_2, \ldots, t_n$ are identified, where $n \geq 1$ (sub-step 430a). A second set of n reference pressures $P_{1\_other}, P_{2\_other}, \ldots, P_{n\_other}$ that were determined using n respective measurements of pressures measured by a second reference pressure sensor during the n respective time periods $t_1, t_2, \ldots, t_n$ are identified (sub-step 430b). A first average reference pressure $P_{average\_1}$ of the first set of n pressure values $P_1, P_2, \ldots, P_n$ is computed (sub-step 430c). A second average reference pressure $P_{average\_2}$ of the second set of n pressure values $P_{1\_other}, P_{2\_other}, \ldots, P_{n\_other}$ is computed (sub-step 430d). A pressure difference $\Delta P$ between the first average reference pressure $P_{average\_1}$ and the second average reference pressure $P_{average\_2}$ is computed (sub-step 430e). Finally, the pressure difference $\Delta P$ is set as the calibration value (sub-step 430f). In different embodiments of FIG. 4F, the second reference pressure sensor is a reference sensor 110 or a gold-standard sensor 105.

A second implementation for determining a calibration value at step 430 includes sub-steps provided in FIG. 4G. As shown, a first set of n reference pressures $P_1, P_2, \ldots, P_n$ that were determined using n respective measurements of pressures measured by the first reference pressure sensor during n respective time periods $t_1, t_2, \ldots, t_n$ are identified, where $n \geq 1$ (sub-step 430g). A second set of n reference pressures $P_{1\_other}, P_{2\_other}, \ldots, P_{n\_other}$ that were determined using n respective measurements of pressures measured by a second reference pressure sensor during the n respective time periods $t_1, t_2, \ldots, t_n$ are identified (sub-step 430h). A set of n pressure difference values $\Delta P_1, \Delta P_2, \ldots, \Delta P_n$ between respective ones of the first set of n reference pressures $P_1, P_2, \ldots, P_n$ and respective ones of the second set of n reference pressures $P_{1\_other}, P_{2\_other}, \ldots, P_{n\_other}$ are computed—e.g., $\Delta P_1 = P_1 - P_{1\_other}, \Delta P_2 = P_2 - P_{2\_other}, \ldots, \Delta P_n = P_n - P_{n\_other}$ (sub-step 430i). An average pressure difference $\Delta P_{average}$ of the n pressure difference values $\Delta P_1, \Delta P_2, \ldots, \Delta P_n$ is computed (sub-step 430j). Finally, the average pressure difference $\Delta P_{average}$ is set as the calibration value (sub-step 430k). In different embodiments of FIG. 4G, the second reference pressure sensor is a reference sensor 110 or a gold-standard sensor 105.

A third implementation for determining a calibration value at step 430 includes sub-steps provided in FIG. 4H. As shown, a first reference pressure $P_1$ that was determined using a first measurement of pressure measured by the first reference pressure sensor at a first time $t_1$ is identified (sub-step 430l), and a second reference pressure $P_2$ that was determined using a second measurement of pressure measured by the first reference pressure sensor at a second time $t_2$ is identified (sub-step 430m). A third reference pressure $P_3$ that was determined using a third measurement of pressure measured by a second reference pressure sensor at a third time $t_3$ is identified (sub-step 430n), and a fourth reference pressure $P_4$ that was determined using a fourth measurement of pressure measured by the second reference pressure sensor at a fourth time $t_4$ is identified (sub-step 430o). A first pressure difference $\Delta P_1$ between the first reference pressure $P_1$ and the second reference pressure $P_2$ is computed (sub-step 430p), and a second pressure difference $\Delta P_2$ between the third reference pressure $P_3$ and the fourth reference pressure $P_4$ is computed (sub-step 430q). A difference in pressure $\Delta P$ between the first pressure difference $\Delta P_1$ and the second pressure difference $\Delta P_2$ is computed (sub-step 430r), and the computed difference in pressure $\Delta P$ is set (e.g., stored) as the calibration value (sub-step 430s). In different embodiments of FIG. 4H, the second reference pressure sensor is a reference sensor 110 or a gold-standard sensor 105.

A fourth implementation for determining a calibration value at step 430 includes setting the calibration value to a computed difference between the first reference pressure $P_1$ and a second reference pressure $P_2$ from FIG. 4B.

Figure 6A:
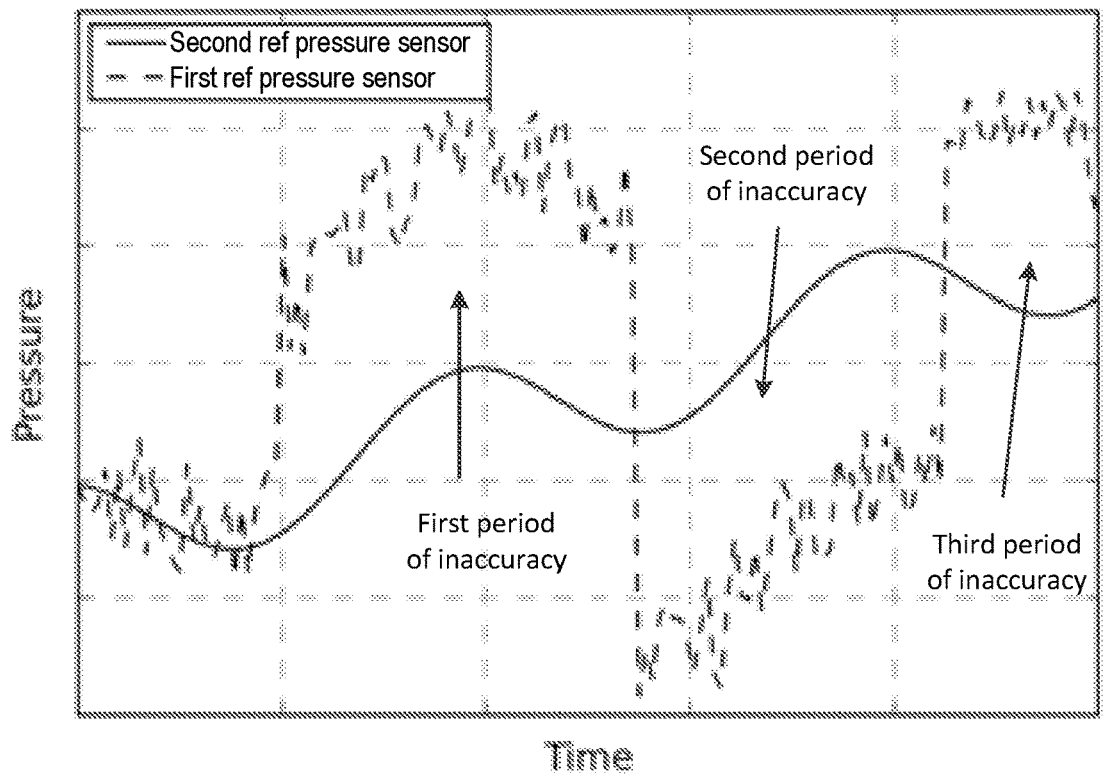
FIG. 6A through FIG. 6D illustrate real-time calibration of pressure data.
Figure 6B:
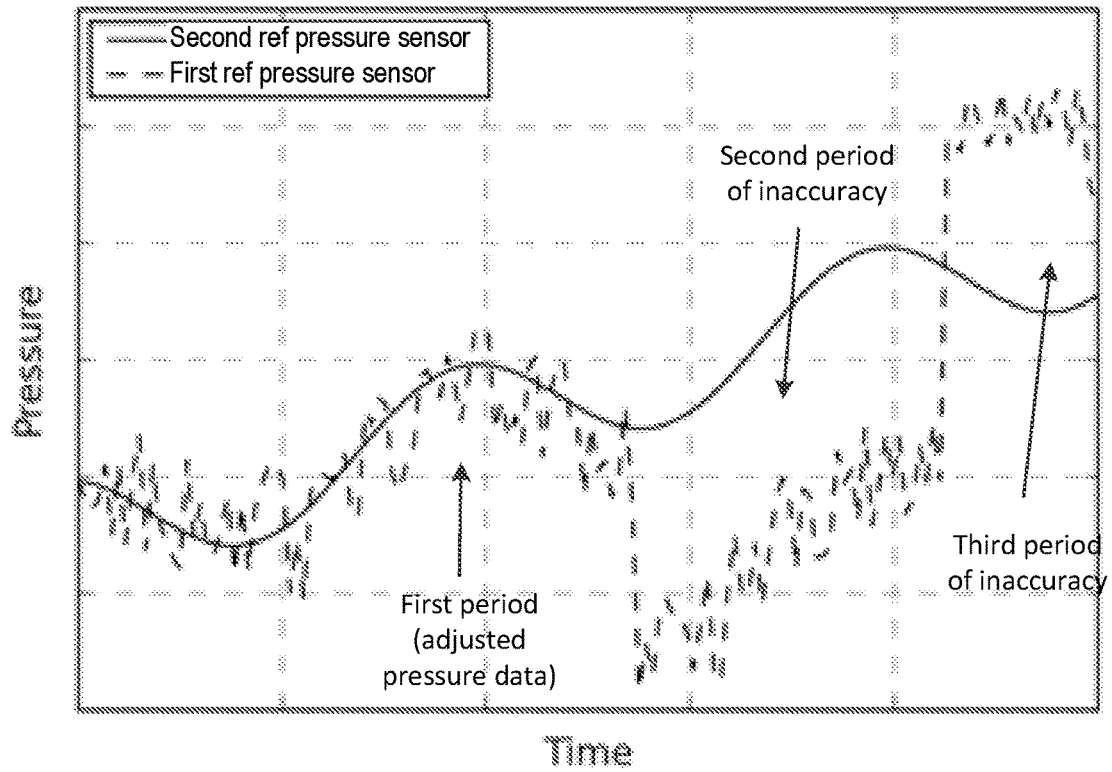
Figure 6C:
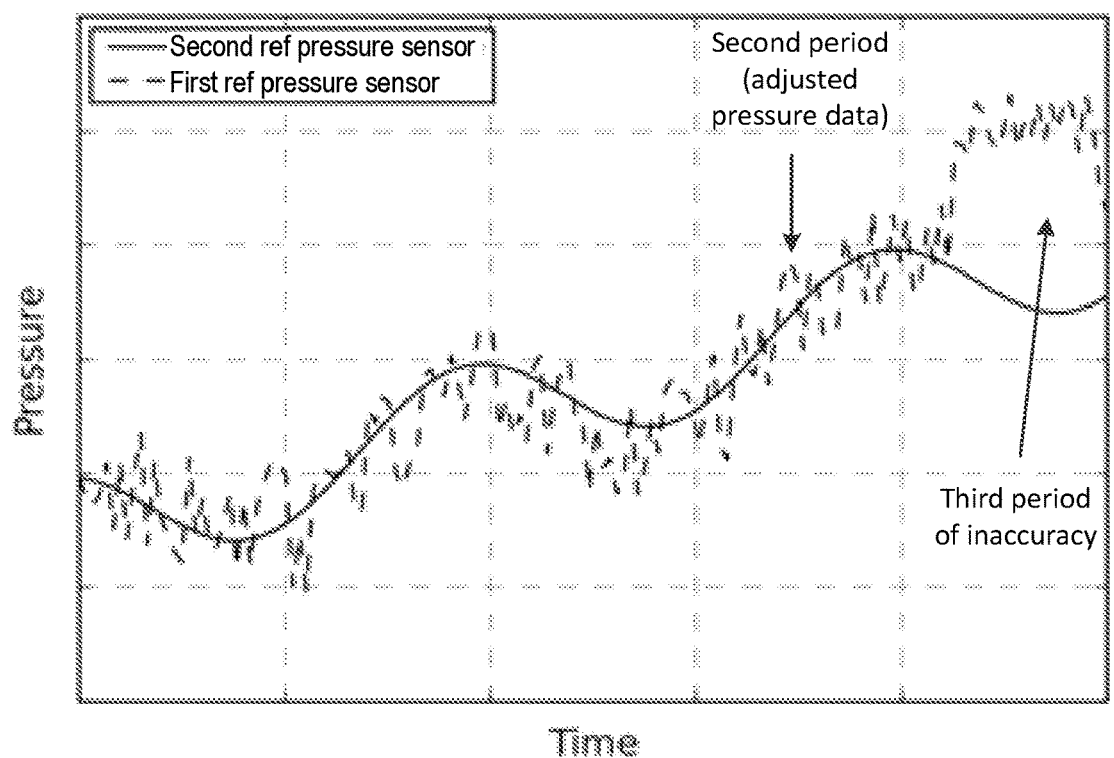
Figure 6D:
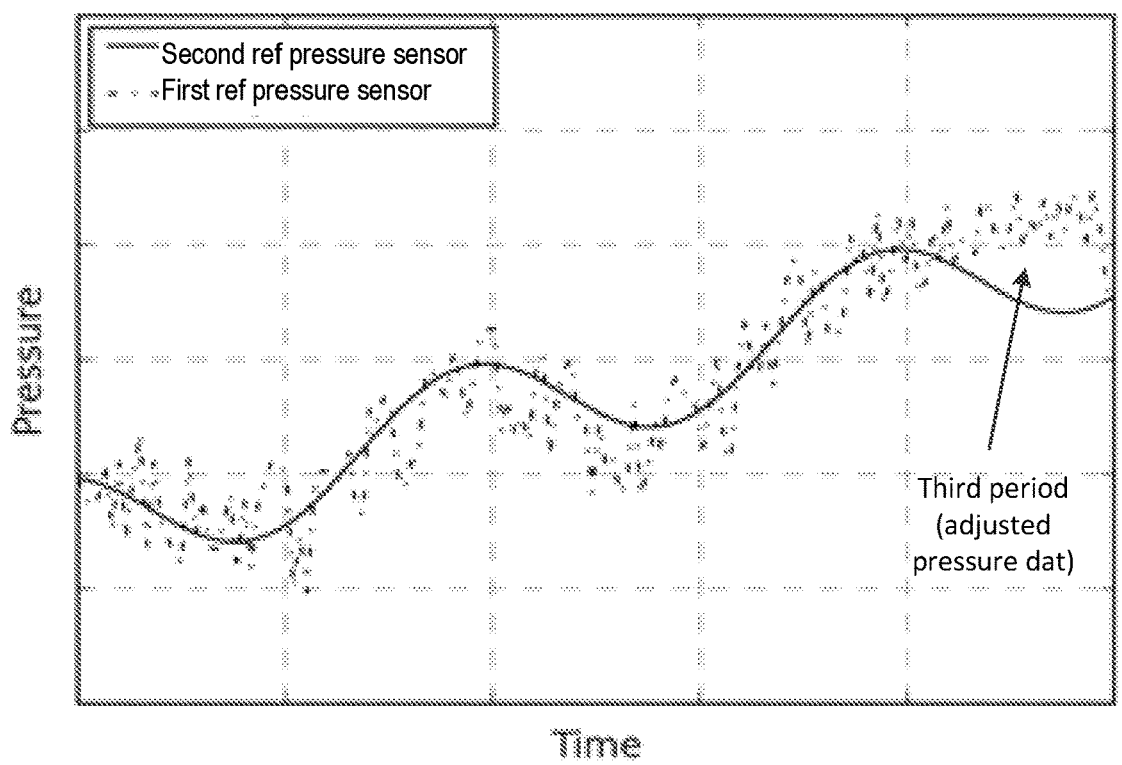

By way of example, advantages of implementing FIG. 4F, FIG. 4G and FIG. 4H are illustrated by the plots of FIG. 6A, FIG. 6B, FIG. 6C and FIG. 6D. Each plot shows accurate pressure data (e.g., reference pressures) for a second reference pressure sensor over time. The plot of FIG. 6A, shows inaccurate pressure data for a first reference pressure sensor during first, second and third time periods. As illustrated by the plot in FIG. 6B, the pressure data for the second reference pressure sensor can be used to compute a calibration value during step 430. During step 440 of FIG. 4A, the computed calibration value is used to compute the adjusted pressure data shown in FIG. 6B for the first reference pressure sensor during the first period. The process is repeated for the second and third times as illustrated in FIG. 6C and FIG. 6D.

Different embodiments of FIG. 4D, FIG. 4E, and FIG. 4H are contemplated. In one embodiment, the first and the third times may be the same or different, and the second and the fourth times may be the same or different. In one embodiment, the first and third times are within a first predefined amount of time from each other (e.g., 10 minutes), and the second and fourth times are within the first predefined amount of time from each other. In one embodiment, the first and second times are within a second predefined amount of time from each other (e.g., 1 hour), and the third and fourth times are within the second predefined amount of time from each other. In one embodiment, the first predefined amount of time is less than the second predefined amount of time.

Other Aspects

The term altitude used herein may refer to an altitude, an elevation, or a height.

Methods of this disclosure may be implemented by hardware, firmware or software. One or more non-transitory machine-readable media embodying program instructions that, when executed by one or more machines, cause the one or more machines to perform or implement operations comprising the steps of any of the methods described herein are contemplated. As used herein, machine-readable media includes all forms of machine-readable media (e.g. non-volatile or volatile storage media, removable or non-removable media, integrated circuit media, magnetic storage media, optical storage media, or any other storage media) that may be patented under the laws of the jurisdiction in which this application is filed, but does not include media that cannot be patented under the laws of the jurisdiction in which this application is filed.

By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art. Systems that include one or more machines or the one or more non-transitory machine-readable media embodying program instructions that, when executed by the one or more machines, cause the one or more machines to perform or implement operations comprising the steps of any methods described herein are also contemplated.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a mobile device can be performed by a server, or vice versa.

Systems comprising one or more modules that perform, are operable to perform, or adapted to perform different method steps/stages disclosed herein are also contemplated, where the modules are implemented using one or more machines listed herein or other suitable hardware. When two things (e.g., modules or other features) are "coupled to" each other, those two things may be directly connected together, or separated by one or more intervening things. Where no lines and intervening things connect two particular things, coupling of those things is contemplated in at least one embodiment unless otherwise stated. Where an output of one thing and an input of another thing are coupled to each other, information sent from the output is received by the input even if the data passes through one or more intermediate things. Different communication pathways and protocols may be used to transmit information disclosed herein. Information like data, instructions, commands, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e., not limited to) as opposed to an exclusive sense (i.e., consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g., a thing that may perform an operation or may have a characteristic need not perform that operation or have that characteristic in each embodiment, but that thing performs that operation or has that characteristic in at least one embodiment.

A mobile device may include any of: antenna module(s) for exchanging signals with other systems; RF front end module(s) with circuitry components that are known; processing module(s) for signal processing of received signals to determine position information (e.g., times of arrival or travel time of received signals, atmospheric information from transmitters, and/or location or other information associated with each transmitter); processing module(s) for using the position information to compute an estimated position of the mobile device; processing module(s) for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the mobile device (e.g., pressure, temperature, other), which may be compared to the same environmental conditions at or near transmitters to determine the altitude of the mobile device; other sensor module(s) for measuring other conditions (e.g., movement, orientation); interface module(s) for exchanging information with other systems via other links other than a radio link; and/or I/O module(s) for permitting user interaction with the mobile device.

RELATED APPLICATIONS

This application relates to the following related application(s): U.S. Pat. Appl. No. 62/467,716, filed 6 Mar. 2017, entitled IMPROVING CROWDSOURCED WEATHER DATA FOR USE IN BAROMETRIC-BASED NAVIGATION AND LOCATION SERVICES. The content of each of the related application(s) is hereby incorporated by reference herein in its entirety.

The invention claimed is:

1. A method for estimating an altitude of a device based on one or more monitored pressure conditions, wherein the method comprises:
   using a first reference pressure sensor at a first location to determine a pressure measurement;
   determining, using the pressure measurement, a reference pressure that specifies an estimated pressure for a reference altitude;
   determining a measurement of pressure using a pressure sensor of the device;
   determining, using one or more machines, if a pressure change condition is met by determining if a threshold change in measured pressure by the first reference pressure sensor is detected, determining, if the threshold change in measured pressure by the first reference pressure sensor is detected, that the pressure change condition is met, and determining, if the threshold change in measured pressure by the first reference pressure sensor is not detected, that the pressure change condition is not met;

if the pressure change condition is met, determining a calibration value for the first reference pressure sensor using the one or more machines;

if the pressure change condition is not met, identifying a previously-determined calibration value using the one or more machines;

determining, using the one or more machines, an adjusted reference pressure, wherein if the pressure change condition is met, the adjusted reference pressure is determined using the reference pressure and the calibration value determined for the first reference pressure sensor, and wherein if the pressure change condition is not met, the adjusted reference pressure is determined using the reference pressure and the previously-determined calibration value; and determining, using the one or more machines, an estimate of the altitude of the device using the adjusted reference pressure and the measurement of pressure from the pressure sensor of the device.

2. The method of claim 1, wherein the determining if the threshold change in measured pressure by the first reference pressure sensor is detected comprises:

identifying a first reference pressure that was determined using a first measurement of pressure measured by the first reference pressure sensor at a first time;

identifying a second reference pressure that was determined using a second measurement of pressure measured by the first reference pressure sensor at a second time;

determining if the first reference pressure and the second reference pressure differ by more than a threshold amount of pressure;

if the first reference pressure and the second reference pressure differ by more than the threshold amount of pressure, determining that the threshold change in measured pressure by the first reference pressure sensor is detected; and if the first reference pressure and the second reference pressure do not differ by more than the threshold amount of pressure, determining that the threshold change in measured pressure by the first reference pressure sensor is not detected.

3. The method of claim 1, wherein the determining if the threshold change in measured pressure by the first reference pressure sensor is detected comprises:

identifying a first reference pressure that was determined using a first measurement of pressure measured by the first reference pressure sensor at a first time;

identifying a second reference pressure that was determined using a second measurement of pressure measured by a second reference pressure sensor at a second time;

determining if the first reference pressure and the second reference pressure differ by more than a threshold amount of pressure;

if the first reference pressure and the second reference pressure differ by more than the threshold amount of pressure, determining that the threshold change in measured pressure by the first reference pressure sensor is detected; and if the first reference pressure and the second reference pressure do not differ by more than the threshold amount of pressure, determining that the threshold change in measured pressure by the first reference pressure sensor is not detected.

4. The method of claim 1, wherein the determining if the threshold change in measured pressure by the first reference pressure sensor is detected comprises:

identifying a first reference pressure that was determined using a first measurement of pressure measured by the first reference pressure sensor at a first time;

identifying a second reference pressure that was determined using a second measurement of pressure measured by the first reference pressure sensor at a second time;

identifying a third reference pressure that was determined using a third measurement of pressure measured by a second reference pressure sensor at a third time;

identifying a fourth reference pressure that was determined using a fourth measurement of pressure measured by the second reference pressure sensor at a fourth time;

determining a first pressure difference between the first reference pressure and the second reference pressure;

determining a second pressure difference between the third reference pressure and the fourth reference pressure;

determining a first time difference between the first time and the second time;

determining a second time difference between the third time and the fourth time;

determining a first derivative of pressure by dividing the first pressure difference by the first time difference;

determining a second derivative of pressure by dividing the second pressure difference by the second time difference;

determining a difference in derivative pressures between the first derivative of pressure and the second derivative of pressure; and determining if the difference in derivative pressures exceeds a threshold amount of derivative pressure;

if the difference in derivative pressures exceeds the threshold amount of derivative pressure, determining that the threshold change in measured pressure by the first reference pressure sensor is detected; and if the difference in derivative pressures does not exceed the threshold amount of derivative pressure, determining that the threshold change in measured pressure by the first reference pressure sensor is not detected.

5. The method of claim 1, wherein the determining if the threshold change in measured pressure by the first reference pressure sensor is detected comprises:

identifying a first reference pressure that was determined using a first measurement of pressure measured by the first reference pressure sensor at a first time;

identifying a second reference pressure that was determined using a second measurement of pressure measured by the first reference pressure sensor at a second time;

determining a first pressure difference between the first reference pressure and the second reference pressure;

determining a first time difference between the first time and the second time;

determining a first derivative of pressure by dividing the first pressure difference by the first time difference;

determining if the first derivative of pressure exceeds a threshold amount of derivative pressure;

if the first derivative of pressure does not exceed the threshold amount of derivative pressure, determining that the threshold change in measured pressure by the first reference pressure sensor is not detected; and if the first derivative of pressure exceeds the threshold amount of derivative pressure:

identifying a third reference pressure that was determined using a third measurement of pressure measured by a second reference pressure sensor at a third time;

identifying a fourth reference pressure that was determined using a fourth measurement of pressure measured by the second reference pressure sensor at a fourth time;

computing a second pressure difference between the third reference pressure and the fourth reference pressure;

computing a second time difference between the third time and the fourth time;

computing a second derivative of pressure by dividing the second pressure difference by the second time difference;

determining if the second derivative of pressure exceeds the threshold amount of derivative pressure; and if the second derivative of pressure does not exceed the threshold amount of derivative pressure, determining that the threshold change in measured pressure by the first reference pressure sensor is detected.

6. The method of claim 1, wherein determining the calibration value for the first reference pressure sensor comprises:

identifying a first set of n reference pressures that were determined using n respective measurements of pressures measured by the first reference pressure sensor during n respective time periods;

identifying a second set of n reference pressures that were determined using n respective measurements of pressures measured by a second reference pressure sensor during the n respective time periods;

determining a first average reference pressure of the first set of n pressure values;

determining a second average reference pressure of the second set of n pressure values; and determining a pressure difference between the first average reference pressure and the second average reference pressure, wherein the pressure difference is the determined calibration value.

7. The method of claim 1, wherein determining the calibration value for the first reference pressure sensor comprises:

identifying a first set of n reference pressures that were determined using n respective measurements of pressures measured by the first reference pressure sensor during n respective time periods;

identifying a second set of n reference pressures that were determined using n respective measurements of pressures measured by a second reference pressure sensor during the n respective time periods;

determining a set of n pressure difference values between respective ones of the first set of n reference pressures and respective ones of the second set of n reference pressures; and determining an average pressure difference of the n pressure difference values, wherein the average pressure difference is the determined calibration value.

8. The method of claim 1, wherein determining the calibration value for the first reference pressure sensor comprises:

identifying a first reference pressure that was determined using a first measurement of pressure measured by the first reference pressure sensor at a first time;

identifying a second reference pressure that was determined using a second measurement of pressure measured by the first reference pressure sensor at a second time;

identifying a third reference pressure that was determined using a third measurement of pressure measured by a second reference pressure sensor at a third time;

identifying a fourth reference pressure that was determined using a fourth measurement of pressure measured by the second reference pressure sensor at a fourth time;

determining a first pressure difference between the first reference pressure and the second reference pressure;

determining a second pressure difference between the third reference pressure and the fourth reference pressure and determining a difference in pressure between the first pressure difference and the second pressure difference, wherein the difference in pressure is the determined calibration value.

9. The method of claim 1, wherein the estimate of the altitude of the device is determined using a measurement of temperature measured at the first location of the first reference pressure sensor or a different location.

10. The method of claim 1, wherein the method comprises:

determining an initial estimate of a position of the device; and identifying the first reference pressure sensor, from a set of reference pressure sensors, because the first reference pressure sensor is closer to the initial estimate of the position of the device than all other reference pressure sensors in the set.

11. One or more non-transitory machine-readable media embodying program instructions that, when executed by one or more machines, cause the one or more machines to implement a method for estimating an altitude of a device based on one or more monitored pressure conditions, wherein the method comprises:

using a first reference pressure sensor at a first location to determine a pressure measurement;

determining, using the pressure measurement, a reference pressure that specifies an estimated pressure for a reference altitude;

determining a measurement of pressure using a pressure sensor of the device;

determining, using one or more machines, if a pressure change condition is met by determining if a threshold change in measured pressure by the first reference pressure sensor is detected, determining, if the threshold change in measured pressure by the first reference pressure sensor is detected, that the pressure change condition is met, and determining, if the threshold change in measured pressure by the first reference pressure sensor is not detected, that the pressure change condition is not met;

if the pressure change condition is met, determining a calibration value for the first reference pressure sensor using the one or more machines;

if the pressure change condition is not met, identifying a previously-determined calibration value using the one or more machines;

determining, using the one or more machines, an adjusted reference pressure, wherein if the pressure change condition is met, the adjusted reference pressure is determined using the reference pressure and the calibration value determined for the first reference pressure sensor, and wherein if the pressure change condition is not met, the adjusted reference pressure is determined using the reference pressure and the previously-determined calibration value; and determining, using the one or more machines, an estimate of the altitude of the device using the adjusted reference pressure and the measurement of pressure from the pressure sensor of the device.

12. The one or more non-transitory machine-readable media of claim 11, wherein the determining if the threshold change in measured pressure by the first reference pressure sensor is detected comprises:

identifying a first reference pressure that was determined using a first measurement of pressure measured by the first reference pressure sensor at a first time;

identifying a second reference pressure that was determined using a second measurement of pressure measured by the first reference pressure sensor at a second time;

determining if the first reference pressure and the second reference pressure differ by more than a threshold amount of pressure;

if the first reference pressure and the second reference pressure differ by more than the threshold amount of pressure, determining that the threshold change in measured pressure by the first reference pressure sensor is detected; and if the first reference pressure and the second reference pressure do not differ by more than the threshold amount of pressure, determining that the threshold change in measured pressure by the first reference pressure sensor is not detected.

13. The one or more non-transitory machine-readable media of claim 11, wherein the determining if the threshold change in measured pressure by the first reference pressure sensor is detected comprises:

identifying a first reference pressure that was determined using a first measurement of pressure measured by the first reference pressure sensor at a first time;

identifying a second reference pressure that was determined using a second measurement of pressure measured by a second reference pressure sensor at a second time;

determining if the first reference pressure and the second reference pressure differ by more than a threshold amount of pressure;

if the first reference pressure and the second reference pressure differ by more than the threshold amount of pressure, determining that the threshold change in measured pressure by the first reference pressure sensor is detected; and if the first reference pressure and the second reference pressure do not differ by more than the threshold amount of pressure, determining that the threshold change in measured pressure by the first reference pressure sensor is not detected.

14. The one or more non-transitory machine-readable media of claim 11, wherein the determining if the threshold change in measured pressure by the first reference pressure sensor is detected comprises:

identifying a first reference pressure that was determined using a first measurement of pressure measured by the first reference pressure sensor at a first time;

identifying a second reference pressure that was determined using a second measurement of pressure measured by the first reference pressure sensor at a second time;

identifying a third reference pressure that was determined using a third measurement of pressure measured by a second reference pressure sensor at a third time;

identifying a fourth reference pressure that was determined using a fourth measurement of pressure measured by the second reference pressure sensor at a fourth time;

determining a first pressure difference between the first reference pressure and the second reference pressure;

determining a second pressure difference between the third reference pressure and the fourth reference pressure;

determining a first time difference between the first time and the second time;

determining a second time difference between the third time and the fourth time;

determining a first derivative of pressure by dividing the first pressure difference by the first time difference;

determining a second derivative of pressure by dividing the second pressure difference by the second time difference;

determining a difference in derivative pressures between the first derivative of pressure and the second derivative of pressure; and determining if the difference in derivative pressures exceeds a threshold amount of derivative pressure;

if the difference in derivative pressures exceeds the threshold amount of derivative pressure, determining that the threshold change in measured pressure by the first reference pressure sensor is detected; and if the difference in derivative pressures does not exceed the threshold amount of derivative pressure, determining that the threshold change in measured pressure by the first reference pressure sensor is not detected.

15. The one or more non-transitory machine-readable media of claim 11, wherein the determining if the threshold change in measured pressure by the first reference pressure sensor is detected comprises:

identifying a first reference pressure that was determined using a first measurement of pressure measured by the first reference pressure sensor at a first time;

identifying a second reference pressure that was determined using a second measurement of pressure measured by the first reference pressure sensor at a second time;

determining a first pressure difference between the first reference pressure and the second reference pressure;

determining a first time difference between the first time and the second time;

determining a first derivative of pressure by dividing the first pressure difference by the first time difference;

determining if the first derivative of pressure exceeds a threshold amount of derivative pressure;

if the first derivative of pressure does not exceed the threshold amount of derivative pressure, determining that the threshold change in measured pressure by the first reference pressure sensor is not detected; and if the first derivative of pressure exceeds the threshold amount of derivative pressure:
identifying a third reference pressure that was determined using a third measurement of pressure measured by a second reference pressure sensor at a third time;
identifying a fourth reference pressure that was determined using a fourth measurement of pressure measured by the second reference pressure sensor at a fourth time;
computing a second pressure difference between the third reference pressure and the fourth reference pressure;
computing a second time difference between the third time and the fourth time;
computing a second derivative of pressure by dividing the second pressure difference by the second time difference;
determining if the second derivative of pressure exceeds the threshold amount of derivative pressure; and
if the second derivative of pressure does not exceed the threshold amount of derivative pressure, determining that the threshold change in measured pressure by the first reference pressure sensor is detected.

16. The one or more non-transitory machine-readable media of claim 11, wherein determining the calibration value for the first reference pressure sensor comprises:
identifying a first set of n reference pressures that were determined using n respective measurements of pressures measured by the first reference pressure sensor during n respective time periods;
identifying a second set of n reference pressures that were determined using n respective measurements of pressures measured by a second reference pressure sensor during the n respective time periods;
determining a first average reference pressure of the first set of n pressure values;
determining a second average reference pressure of the second set of n pressure values; and
determining a pressure difference between the first average reference pressure and the second average reference pressure, wherein the pressure difference is the determined calibration value.

17. The one or more non-transitory machine-readable media of claim 11, wherein determining the calibration value for the first reference pressure sensor comprises:
identifying a first set of n reference pressures that were determined using n respective measurements of pressures measured by the first reference pressure sensor during n respective time periods;
identifying a second set of n reference pressures that were determined using n respective measurements of pressures measured by a second reference pressure sensor during the n respective time periods;
determining a set of n pressure difference values between respective ones of the first set of n reference pressures and respective ones of the second set of n reference pressures; and
determining an average pressure difference of the n pressure difference values, wherein the average pressure difference is the determined calibration value.

18. The one or more non-transitory machine-readable media of claim 11, wherein determining the calibration value for the first reference pressure sensor comprises:
identifying a first reference pressure that was determined using a first measurement of pressure measured by the first reference pressure sensor at a first time;
identifying a second reference pressure that was determined using a second measurement of pressure measured by the first reference pressure sensor at a second time;
identifying a third reference pressure that was determined using a third measurement of pressure measured by a second reference pressure sensor at a third time;
identifying a fourth reference pressure that was determined using a fourth measurement of pressure measured by the second reference pressure sensor at a fourth time;
determining a first pressure difference between the first reference pressure and the second reference pressure;
determining a second pressure difference between the third reference pressure and the fourth reference pressure and
determining a difference in pressure between the first pressure difference and the second pressure difference, wherein the difference in pressure is the determined calibration value.

19. The one or more non-transitory machine-readable media of claim 11, wherein the estimate of the altitude of the device is determined using a measurement of temperature measured at the first location of the first reference pressure sensor or a different location.

20. The one or more non-transitory machine-readable media of claim 11, wherein the method comprises:
determining an initial estimate of a position of the device; and
identifying the first reference pressure sensor, from a set of reference pressure sensors, because the first reference pressure sensor is closer to the initial estimate of the position of the device than all other reference pressure sensors in the set.

* * * * *